(12) United States Patent
Loughlin-McHugh et al.

(10) Patent No.: US 10,325,090 B2
(45) Date of Patent: Jun. 18, 2019

(54) DIGITAL IDENTITY SYSTEM

(71) Applicant: Yoti Holding Limited, London (GB)

(72) Inventors: Eleanor Simone Frederika Loughlin-McHugh, London (GB); Roman Edward Szczesniak, London (GB)

(73) Assignee: Yoti Holding Limited, London (GB)

( * ) Notice: Subject to any disclaimer, the term of this patent is extended or adjusted under 35 U.S.C. 154(b) by 0 days.

(21) Appl. No.: 15/818,538

(22) Filed: Nov. 20, 2017

(65) Prior Publication Data
US 2018/0089419 A1 Mar. 29, 2018

Related U.S. Application Data

(63) Continuation of application No. 14/622,709, filed on Feb. 13, 2015, now Pat. No. 9,858,408.

(51) Int. Cl.
G06F 15/16 (2006.01)
G06F 7/04 (2006.01)
G06F 17/30 (2006.01)
H04L 29/06 (2006.01)
G06F 21/45 (2013.01)

(52) U.S. Cl.
CPC .......... G06F 21/45 (2013.01); H04L 63/0807 (2013.01); G06F 2221/2117 (2013.01); H04L 63/0853 (2013.01); H04L 2463/082 (2013.01)

(58) Field of Classification Search
CPC .................................................. G06F 21/30
USPC ......................................................... 726/6
See application file for complete search history.

(56) References Cited

U.S. PATENT DOCUMENTS 6,993,658 B1 * 1/2006 Engberg .................. G06F 21/43
                                                   379/114.2
7,073,195 B2   7/2006 Brickell
(Continued)

FOREIGN PATENT DOCUMENTS

CN      101641707 A    2/2010
EP      1942430 A1     7/2008

OTHER PUBLICATIONS

Elisa Bertino; Privacy-preserving Digital Identity Management for Cloud Computing; ieee-2009; p. 1-7.*
(Continued)

Primary Examiner — Monjur Rahim
(74) Attorney, Agent, or Firm — Knobbe, Martens, Olson & Bear, LLP

(57) ABSTRACT

The disclosure relates to a digital identity system including an enrolment module executing on a processor configured to receive a data item from an enrolling device and to create in persistent electronic storage a digital profile comprising the data item. The system also includes a credential creation module executing on a processor configured to generate a credential from a random sequence, to associate the credential with the digital profile in a database, and to transmit the credential to the enrolling device. The system further includes a publication module executing on a processor configured, in response to later presentation of the credential to the digital identity system, to publish the digital profile by storing a version of the digital profile in a memory location accessible to a device presenting the credential.

20 Claims, 27 Drawing Sheets

(56) References Cited

U.S. PATENT DOCUMENTS

| | | | |
|---|---|---|---|
| 7,690,032 B1* | 3/2010 | Peirce | G06F 21/32 |
| | | | 380/229 |
| 8,762,288 B2 | 6/2014 | Dill | |
| 8,862,664 B1 | 10/2014 | Lin et al. | |
| 8,908,977 B2 | 12/2014 | King | |
| 8,997,195 B1 | 3/2015 | Fadida et al. | |
| 9,172,697 B1* | 10/2015 | Holtz | H04L 63/083 |
| 9,721,147 B1* | 8/2017 | Kapczynski | G06K 9/00288 |
| 2002/0165861 A1 | 11/2002 | Gilmour | |
| 2003/0023878 A1 | 1/2003 | Rosenberg et al. | |
| 2003/0136850 A1 | 7/2003 | Yamagishi et al. | |
| 2003/0145223 A1 | 7/2003 | Brickell et al. | |
| 2003/0217294 A1* | 11/2003 | Kyle | G06K 9/00221 |
| | | | 713/186 |
| 2004/0220964 A1 | 11/2004 | Shiftan et al. | |
| 2006/0056625 A1 | 3/2006 | Nakabayashi et al. | |
| 2006/0159312 A1* | 7/2006 | Chiang | G06K 9/00221 |
| | | | 382/115 |
| 2006/0161435 A1 | 7/2006 | Atef et al. | |
| 2006/0282662 A1 | 12/2006 | Whitcomb | |
| 2007/0005627 A1 | 1/2007 | Dodge | |
| 2007/0005874 A1 | 1/2007 | Dodge | |
| 2007/0067828 A1 | 3/2007 | Bychkov | |
| 2007/0107017 A1 | 5/2007 | Angel et al. | |
| 2007/0203852 A1 | 8/2007 | Cameron et al. | |
| 2007/0240202 A1 | 10/2007 | Sullivan et al. | |
| 2008/0197192 A1 | 8/2008 | Lindahl et al. | |
| 2009/0172775 A1 | 7/2009 | Mardikar et al. | |
| 2009/0196423 A1 | 8/2009 | Chandrasekaran et al. | |
| 2009/0228365 A1 | 9/2009 | Tomchek et al. | |
| 2010/0107229 A1 | 4/2010 | Najafi et al. | |
| 2010/0262832 A1 | 10/2010 | Tie et al. | |
| 2011/0093385 A1 | 4/2011 | Minnis et al. | |
| 2011/0125770 A1 | 5/2011 | Battestini et al. | |
| 2011/0126272 A1* | 5/2011 | Betzler | G06F 21/41 |
| | | | 726/6 |
| 2011/0167059 A1 | 7/2011 | Fallah | |
| 2011/0167148 A1 | 7/2011 | Bodziony et al. | |
| 2011/0197266 A1 | 8/2011 | Chu et al. | |
| 2011/0231666 A1* | 9/2011 | Guenther | G06F 21/32 |
| | | | 713/186 |
| 2012/0011066 A1* | 1/2012 | Telle | G06Q 20/385 |
| | | | 705/44 |
| 2012/0084135 A1 | 4/2012 | Nissan et al. | |
| 2012/0090038 A1* | 4/2012 | Pacella | G06Q 20/32 |
| | | | 726/30 |
| 2012/0114190 A1 | 5/2012 | Bladel et al. | |
| 2012/0144461 A1 | 6/2012 | Rathbun | |
| 2012/0214443 A1 | 8/2012 | Daigle | |
| 2012/0291108 A1 | 11/2012 | Talamo et al. | |
| 2013/0117861 A1 | 5/2013 | Aussel et al. | |
| 2013/0124292 A1 | 5/2013 | Juthani | |
| 2013/0138570 A1 | 5/2013 | Ross | |
| 2013/0151419 A1 | 6/2013 | Hitchcock et al. | |
| 2013/0227651 A1 | 8/2013 | Schultz et al. | |
| 2013/0318249 A1 | 11/2013 | McDonough et al. | |
| 2013/0318575 A1 | 11/2013 | Hart et al. | |
| 2014/0007205 A1 | 1/2014 | Oikonomou | |
| 2014/0025620 A1 | 1/2014 | Greenzeiger et al. | |
| 2014/0032723 A1* | 1/2014 | Nema | G06Q 10/00 |
| | | | 709/220 |
| 2014/0101744 A1* | 4/2014 | Liu | H04L 9/3228 |
| | | | 726/7 |
| 2014/0115341 A1* | 4/2014 | Robertson | H04L 9/3228 |
| | | | 713/183 |
| 2014/0173695 A1 | 6/2014 | Valdivia | |
| 2014/0181911 A1 | 6/2014 | Kula | |
| 2014/0196110 A1 | 7/2014 | Rubinstein | |
| 2014/0207518 A1 | 7/2014 | Kannan et al. | |
| 2014/0270349 A1 | 9/2014 | Amtrup et al. | |
| 2014/0281509 A1* | 9/2014 | Angelo | G06F 21/602 |
| | | | 713/164 |
| 2014/0294175 A1 | 10/2014 | Boloker | |
| 2014/0294258 A1 | 10/2014 | King | |
| 2014/0333414 A1 | 11/2014 | Kursun | |
| 2014/0337954 A1 | 11/2014 | Ahmed et al. | |
| 2014/0359722 A1 | 12/2014 | Schultz et al. | |
| 2014/0379477 A1 | 12/2014 | Sheinfeld et al. | |
| 2015/0007297 A1* | 1/2015 | Grossemy | G06F 21/31 |
| | | | 726/7 |
| 2015/0082399 A1* | 3/2015 | Wu | G06F 21/6209 |
| | | | 726/6 |
| 2015/0172273 A1* | 6/2015 | Dong | H04L 63/083 |
| | | | 726/7 |
| 2015/0270971 A1 | 9/2015 | Dietrich | |

OTHER PUBLICATIONS

Ryutov et al., "Adaptive Trust Negotiation and Access Control," ACM, New York, NY, 2005; pp. 139-146.
Xu et al., "k-Anonymous Secret Handshakes with Reusable Credentials,"; ACM, New York, NY, 2005; pp. 1-10.
International Search Report and Written Opinion dated May 17, 2016 in International Application No. PCT/EP2016/053075.
International Search Report and Written Opinion dated Aug. 4, 2016 in International Application No. PCT/EP2016/053073.
Chenxi Zhang, An Efficient Identity-based Batch Verification Scheme for Vehicular Sensor Networks, IEEE: 2008, p. 816-823.

* cited by examiner

| Credential | Reference Key | URI | N/W address | Link to uPass | Expiration Time | Lifecycle metadata |
|---|---|---|---|---|---|---|
| 30 | 60 | 62 | 64 | 66 | 68 | 70 |
| | | | | | | |
| | | | | | | |
| | | | | | | |
| | | | | | | |

FIG. 3b

| Data Group | Data Element | Fixed/ Variable | Mandatory/ Optional | Data Item |
|---|---|---|---|---|
| DG1 | | | M | MRZ (Summary of details as recorded on MRTD. Refer to Doc 9303) |
| | 01 | F | M | Document type |
| | 02 | F | M | Issuing State or organization |
| | 03 | F | M | Name (of holder) |
| | 04 | F | M | Document number (Nine most significant characters) |
| | 05 | F | M | Check digit — Document number or filler character (<) indicating document number exceeds nine characters. (see 10.2.2) |
| | 06 | F | M | Nationality |
| | 07 | F | M | Date of birth |
| | 08 | F | M | Check digit — Date of birth |
| | 09 | F | M | Sex |
| | 10 | F | M | Date of expiry (For MRP, TD-1 and TD-2) |
| | 11 | F | M | Check digit — Date of expiry or valid until date |
| | 12 | F | M | Optional data and/or in the case of a TD-1 least significant characters of document number plus document number check digit plus filler character |
| | 13 | F | M | Check digit — Optional data field |
| | 14 | F | M | Composite check digit |

- DG5 - Portrait;
- DG7 - Signature;
- MRZ - Machine Readable Zone of Passport.

FIG. 5

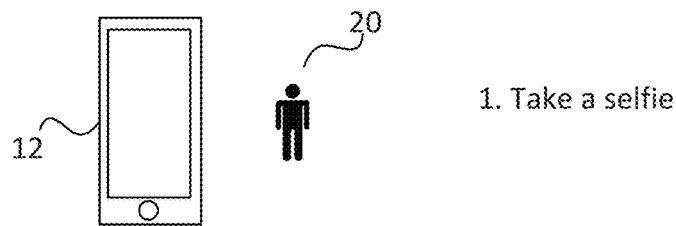
1. Take a selfie
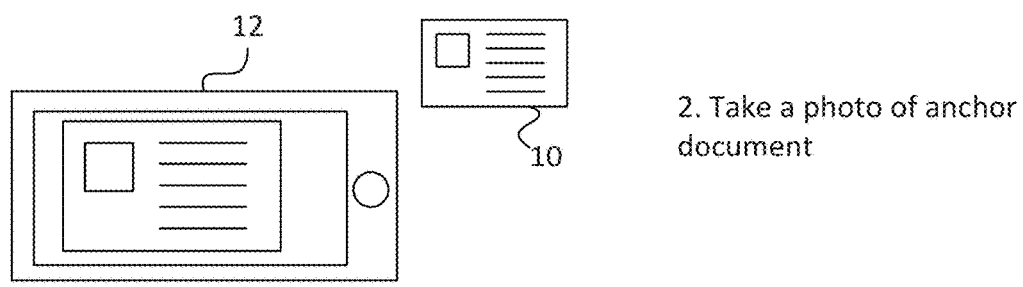
2. Take a photo of anchor document
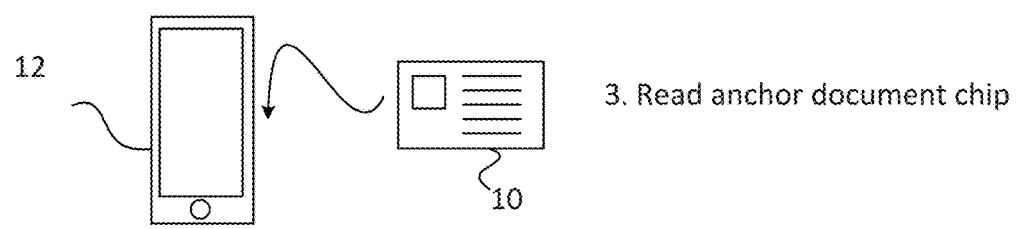
3. Read anchor document chip
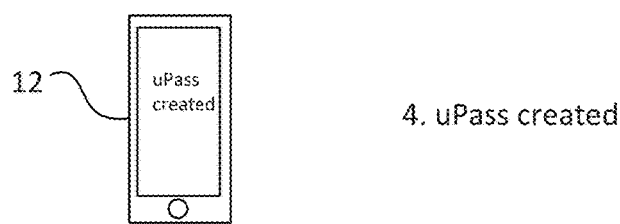
4. uPass created
FIG. 11A

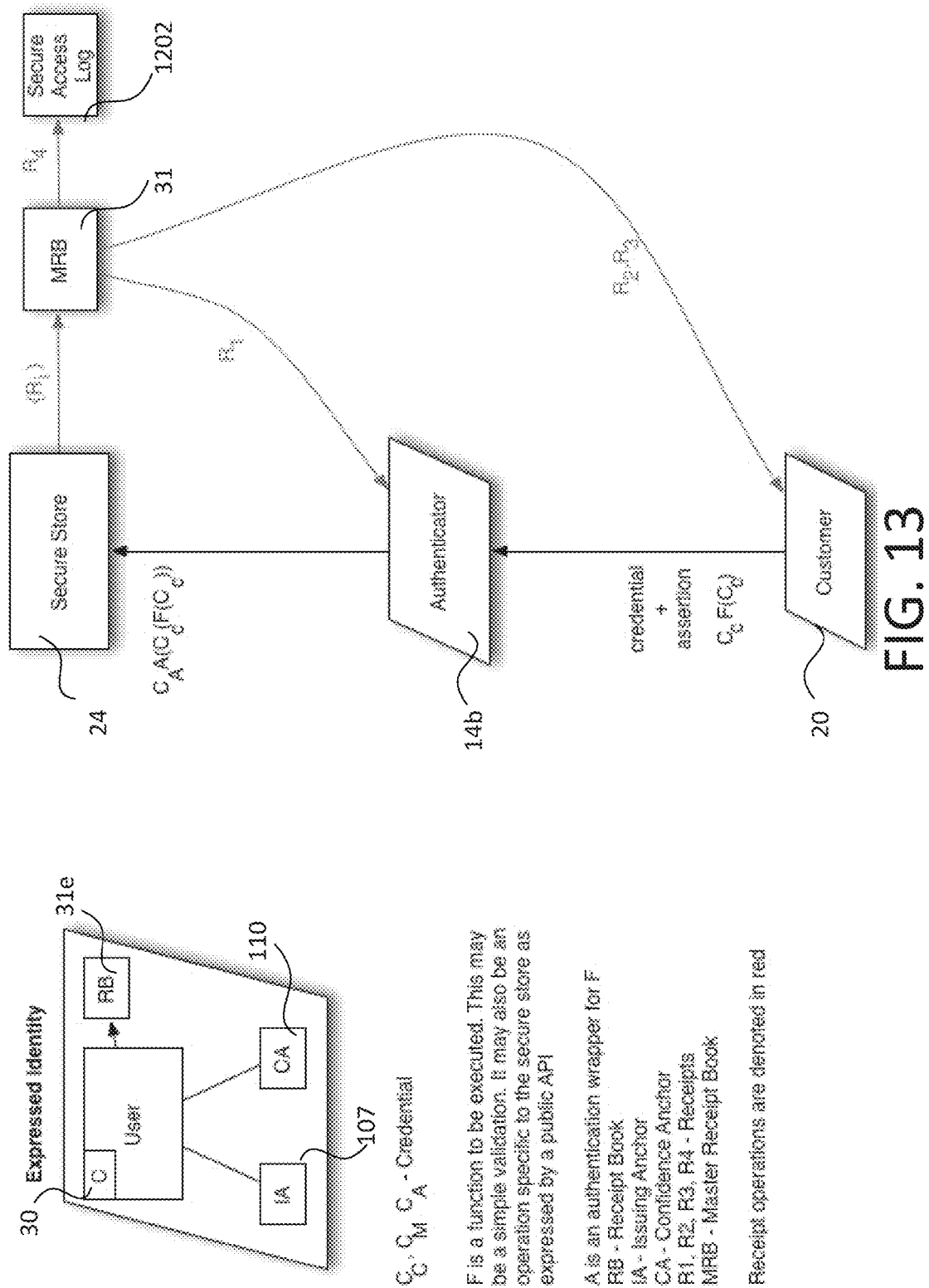

DIGITAL IDENTITY SYSTEM

RELATED APPLICATIONS

The following applications are incorporated herein by reference in their entirety:

| Application No. | Title | Date Filed |
|---|---|---|
| 14/622,740 | AUTHENTICATION OF WEB CONTENT | Feb. 13, 2015 |
| 14/622,527 | DIGITAL IDENTITY | Feb. 13, 2015 |
| 14/622,737 | DIGITAL IDENTITY | Feb. 13, 2015 |
| 14/622,549 | CONFIDENCE VALUES | Feb. 13, 2015 |

BACKGROUND

Field

The described technology generally relates to a digital identity system.

Description of Related Technology

From time to time people need to prove some aspect of their identity, and often the most compelling way to do this is with a passport or other national photo ID such as a driving licence or (in jurisdictions which mandate them) an identity card. However whilst these documents are greatly trusted due to the difficulty involved in making fraudulent copies and their issuance by government institutions, they are also sufficiently valuable that it is preferable not to have to carry them everywhere with us.

SUMMARY OF CERTAIN INVENTIVE ASPECTS

Herein an identity is instead asserted using a digital profile. A profile may for instance be created from data captured from a real-world identity document such as a passport or driving licence, which preferably comprises an identification photograph form the document. Once created, the profile can be used by the entity to assert their identity to another entity (validator).

In a first aspect a digital identity system comprises: an enrolment module executing on a processor configured to receive a data item from an enrolling device and to create in persistent electronic storage a digital profile comprising the data item; a credential creation module executing on a processor configured to generate a credential from a random sequence, to associate the credential with the digital profile in a database, and to transmit the credential to the enrolling device; a publication module executing on a processor configured, in response to later presentation of the credential to the digital identity system, to publish the digital profile by storing a version of the digital profile in a memory location accessible to a device presenting the credential.

An entity (which may be a user of the enrolling device or the enrolling device itself) can provide their credential a presenting entity (e.g. the presenting device or user thereof) as a way to assert their identity, as embodied in the profile, to the presenting entity. That is, the digital credential and profile can be used as a substitute for a real-world identity document.

By publishing a version of the profile rather than permitting direct access to the profile, security of the profile is preserved as the underlying profile itself is never visible outside of the digital identity system.

A link, such as a Uniform Resource Indicator (URI), identifying the addressable memory location may be transmitted to the presenting device.

The link is generated from a random sequence and/or the addressable memory location is selected based on a random sequence. Random generation of links/selection of memory addresses ensures efficient use of the memory address/link space.

The data item may for instance be a visual image of the entity. For a human entity, this may be a photo of their face which captured from, or which is known to match, an identification photograph from a real-world identification document such as a passport or driving licence. This may be captured using a camera and/or wireless (NFC, Bluetooth etc.) technology if a suitable electronic chip is embedded in the document. The other entity can verify that the user is who they say they are by visually comparing the user's actual face with that in the published profile. Other data items such the user's name, data of birth, nationality etc. from the identity document may also be received and stored in the profile. Multiple profiles may be created for a user, which may be unique but nonetheless share some data items. For example, a basic profile may have only one data item (e.g. photo), and additional profile(s) may have the photo plus varying degrees of addition user data (name, name and date of birth, name and date of birth and nationality etc.).

Preferably, metadata available to a computer device sending the electronic message is included in the message. The metadata may be metadata of the device itself, e.g. a device identifier (ID) such as a serial number or MAC address of the device, or it may be related metadata such as (geo) location (e.g. GPS) data identifying a (geo)location of the device when the message was sent. The metadata can be used to generate the credential, for example as a hash of the metadata and a random sequence (seed). This may result in a credential having a large bit size, thus a significant memory saving results from storing the "ingredients" used to create the credential at the digital identity system rather than the credential itself. A copy of the credential can then be created as and when it is needed, for instance to determine whether a credential presented to the system matches the original (access to the published profile may only be granted if this is the case). The seed and metadata may be hashed a random number of times, and the stored ingredients then include this random number as well.

Where the metadata comprises a device ID to the profile may only be granted if the credential is presented along with a matching device ID. Thus, use of the credential is restricted to that device for added security (if the user wishes to use multiple devices to assert their identify, they can request a separate credential for each device, each credential bound to the profile).

A receipt may be generated every time a transaction involving the profile takes place. Such receipts provide an audit trail, whereby historic activity by the entity is visible within the system. For example, the receipts can be used to isolate historic fraudulent activity by a human entity (user). Where the data item is a visual image of the user's face, this makes it easy to unequivocally link such activity back to an actual human. Preferably the profile is republished at every transaction to provide a "snapshot" of the profile as it was at that time, which is unaffected by future modifications. This ensures an accurate audit trail, whereby activity at any previous point in time can be accurately isolated.

Preferably, the profile is published upon presentation of the credential to the digital identity system e.g. by the validator so that the profile only becomes accessible to the validator when they present the credential.

For the purposes of auditing, a master receipt comprising data of each receipt may in embodiments be generated and stored in a master receipt book at the digital identity system. That is, both the first and the master receipt may be stored separately at the digital identity system. The master receipt may comprise only part of the first receipt, for instance the link and the transaction identifier, but not the credential.

Preferably the credential is a randomised one-time only use credential, which can only be used to effect a single transaction and becomes invalid thereafter. This links the credential to the creation of the profile specifically. Similar one-time use credentials will then be needed any time the entity subsequently accesses and/or modifies the profile, and or creates a new profile, so that every credentials are linked to one specific transaction.

In a second aspect, a method of providing access to a digital profile comprises receiving a one-time only use credential associated with a digital profile in persistent electronic storage; validating the credential and, only if the credential is valid, publishing the profile to an addressable memory location by storing a version of it at the memory location, thereby invalidating the credential; generating a fresh one-time only use credential for the digital profile; associating the fresh credential with the digital profile; and transmitting the fresh credential to an address associated with an entity, whereby the entity can use the fresh credential once thereafter to cause the profile to be republished to a different addressable memory location.

In accordance with the second aspect, every time a current credential is presented, a new version of the profile is published and a fresh credential created.

The profile may also have a confidence value allocated to it, which is indicative of the confidence the system has that the entity does indeed have the identity which they are asserting. The confidence value is preferably made available with the published profile, for instance it may be included in and published with the profile itself to the same memory location. Thus, the validator is not simply told that the entity is who or what they say they are, but is told how confident the digital identity system that that is the case. The confidence value may be an easily interpretable metric such as a value between 0 and 1 (or 0% and 100%), 0(%) representing complete uncertainty and 1(00%) representing total certainty, though the latter is unlikely in practice. The confidence value may change over time. For instance as the user uploads more data items e.g. photos of their face ("selfies") which may in some embodiments be required to log in to the digital identity system and stored at the digital identity system each time this may assert a positive influence on the confidence value causing it to (at least in the absence of other influences) increase, provided the photos do indeed match (whereas photos for which the match is questionable may have the opposite effect). Similarly, as the entity completes additional transaction this may exert a similarly positive influence. Conversely, where the data item(s) in the digital profile are captures from, say, a real-world identify document, as the document ages this may assert a negative influence on the confidence value causing it to (at least in the absence of other influences) decrease. Many such influences may be aggregated, whereby the confidence value reflects an overall confidence.

A computer program product comprising code stored on a computer readable storage medium configured to implement any method or system disclosed herein is also provided.

BRIEF DESCRIPTION OF THE DRAWINGS

For a better understanding of the described technology and to show how the same may be carried into effect, reference will now be made by way of example to the accompanying drawings in which:

FIG. 3b is a block diagram of a database structure for a digital identity system;

FIG. 5 illustrates standardised passport information;

FIG. 11A exemplifies how a digital identity may be created;

FIGS. 12 and 13 show examples of uPass transactions.

DETAILED DESCRIPTION OF CERTAIN EMBODIMENTS

The following description discloses an identity registration and authentication system referred to as an uPass system.

As a basic premise, a user of the uPass system is able to upload and register copies of their identity documents and in return they receive an anchored digital ID which can be used to verify their identity to third parties without needing to present these identity documents. They are also able to specify the nature and quantity of personal information which will be made available when doing this.

Use cases for when an identity is to be registered or verified are assumed to be strongly associated with the use of mobile devices such as smartphones and tablets although the described technology is not restricted to these devices. Further, registration is described which is based on identity documents which are designed to be scanned electronically, either with OCR-friendly text or with NFC-compatible embedded chips, by way of non-limiting example. It will be evident from the following that any kind of data items pertaining to identity may be utilised, and entered into the system in any appropriate manner.

Figure 1:
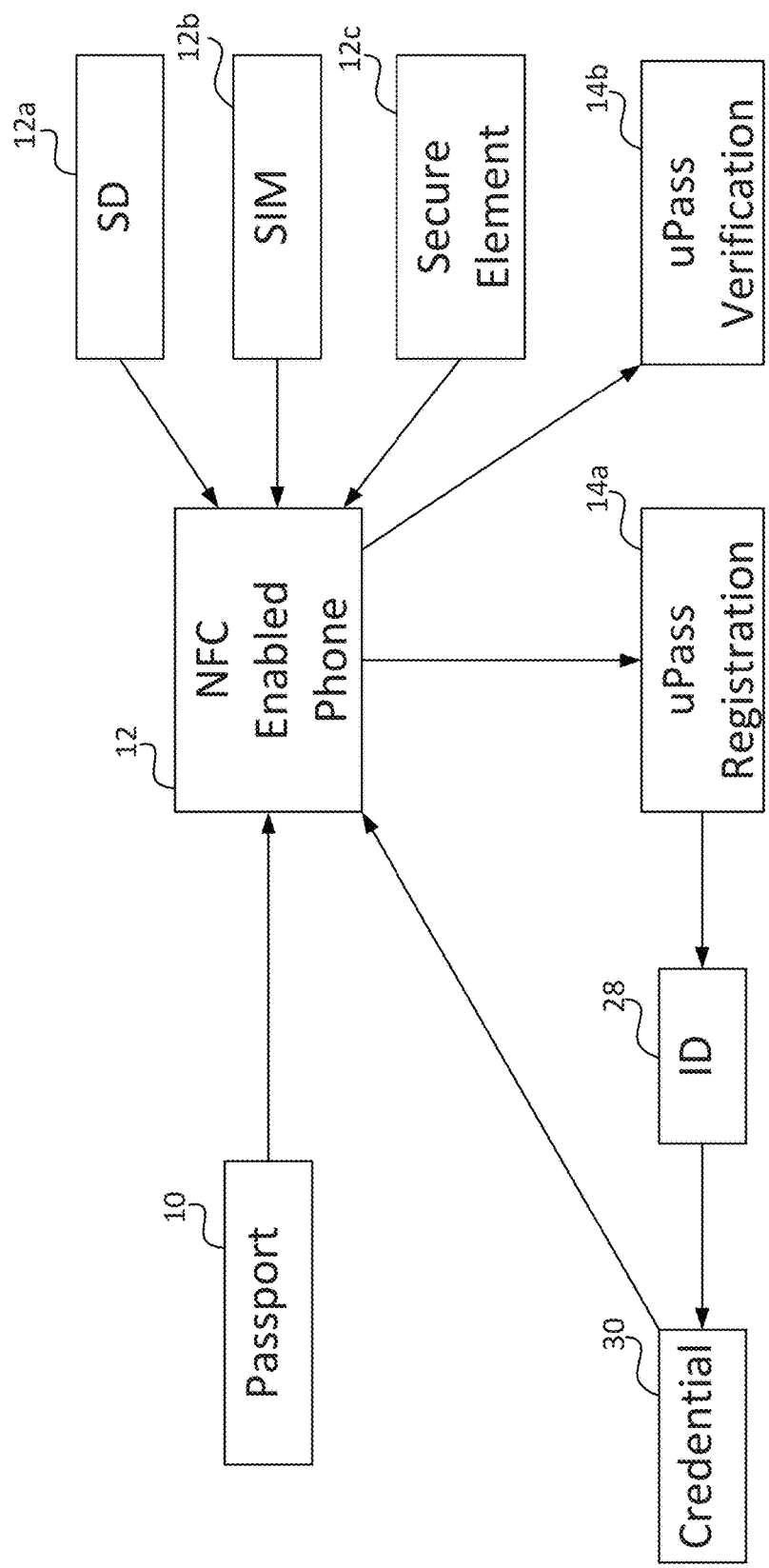
FIG. 1 is a schematic diagram of the core elements of a digital identity system.
Figure 1A:
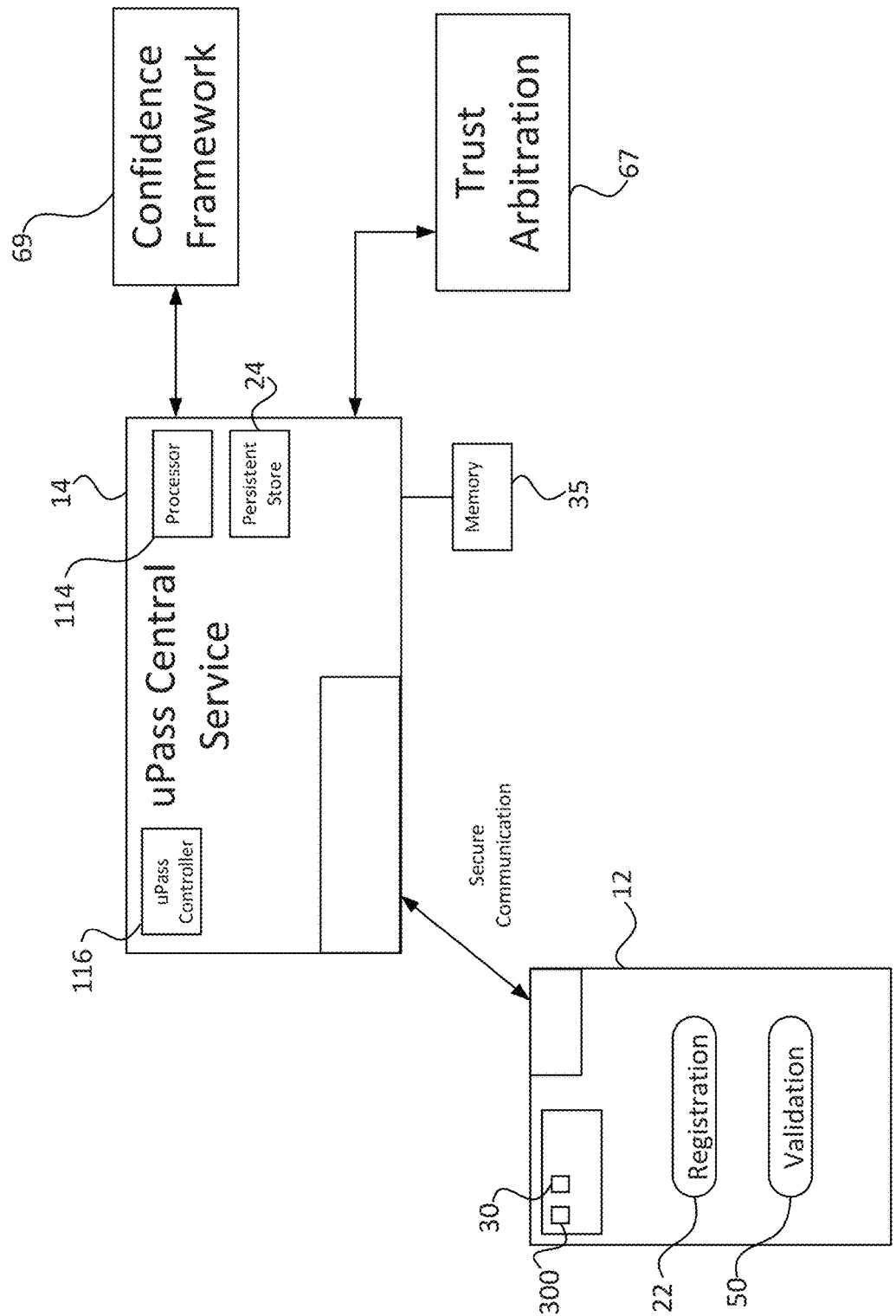
FIG. 1a is schematic block diagram of the principal components of a digital identity system.

FIG. 1a is a schematic block diagram of the principle components of a digital identity system.

A central service (uPass) 14 stores credentials securely and manages validations. The central service can be implemented in any suitable way and requires at least one processor 114 executing identity management code, and electronic storage components providing secure storage. There can be multiple processors in a distributed micro processing network, or a central processing unit at a single or multiple servers. The electronic storage components can take any form and may be local or remote memory. As will be evident, the electronic storage provides both secure storage and random access writable storage 35.

A first mobile application 22 is provided for hosting on a mobile device 12. The first mobile application is for scanning data items from an identity document and transmitting them to the central service 14.

A second mobile application 50 is also provided for execution by a mobile device 12, the second mobile application for requesting a validation of credentials against the storage service 14. It will be appreciated that not all mobile devices necessarily have both applications 22 and 50. For example, some mobile devices may be equipped only to scan [data items and transmit them to the central service 14 whereas other devices may be capable only of performing validation of credentials. It is likely however, that most mobile devices associated with uPass users will have both applications uploaded.

A secure architecture is provided for communication between components of the system. This ensures that privacy is maintained, in particular when considering communications between mobile devices 12 associated with uPass users and the central service 14.

A confidence framework 69 is provided for assessing the degree of confidence which can be placed in a identity profile registered at the central service 14. An automated mechanism 67 is provided for performing timely trust arbitration between users via proffered credentials (for example QR codes). Each component of the system will now be described in more detail in the following.

FIG. 1 shows basic elements of an identity system in highly schematic form. There are two basic workflows, one relating to registration of user identity documents and the other to verification of identity (authentication).

An electronic passport 10 or other identity document (e.g. driving licence) is read by a mobile device 12 (e.g. via NFC) and registration data is passed to the uPass service 14 in a secure manner via the Internet, as decribed later. The uPass service stores the registration of data in one or more profiles forming part of a digital identity 28.

There are three elements in a mobile device which can be used for storage; an SD card 12a or similar removable store; the SIM-card 12b and, in some devices, an internal secure storage space 12c. Such a storage element can be used to store a credential 30 (e.g. a QR code) generated by the uPass system from a digital profile and returned to the mobile device 12.

The uPass service 14 is provided by a computer system with separate endpoints (14a, 14b) for registration and verification. Partitioning of the workflow in this manner gives confidence that a fault in the registration endpoint will not necessarily compromise the verification endpoint and vice versa. End points may be physically separate computers which can communicate via a network, or virtually separate domains at the same physical location.

Figure 10:
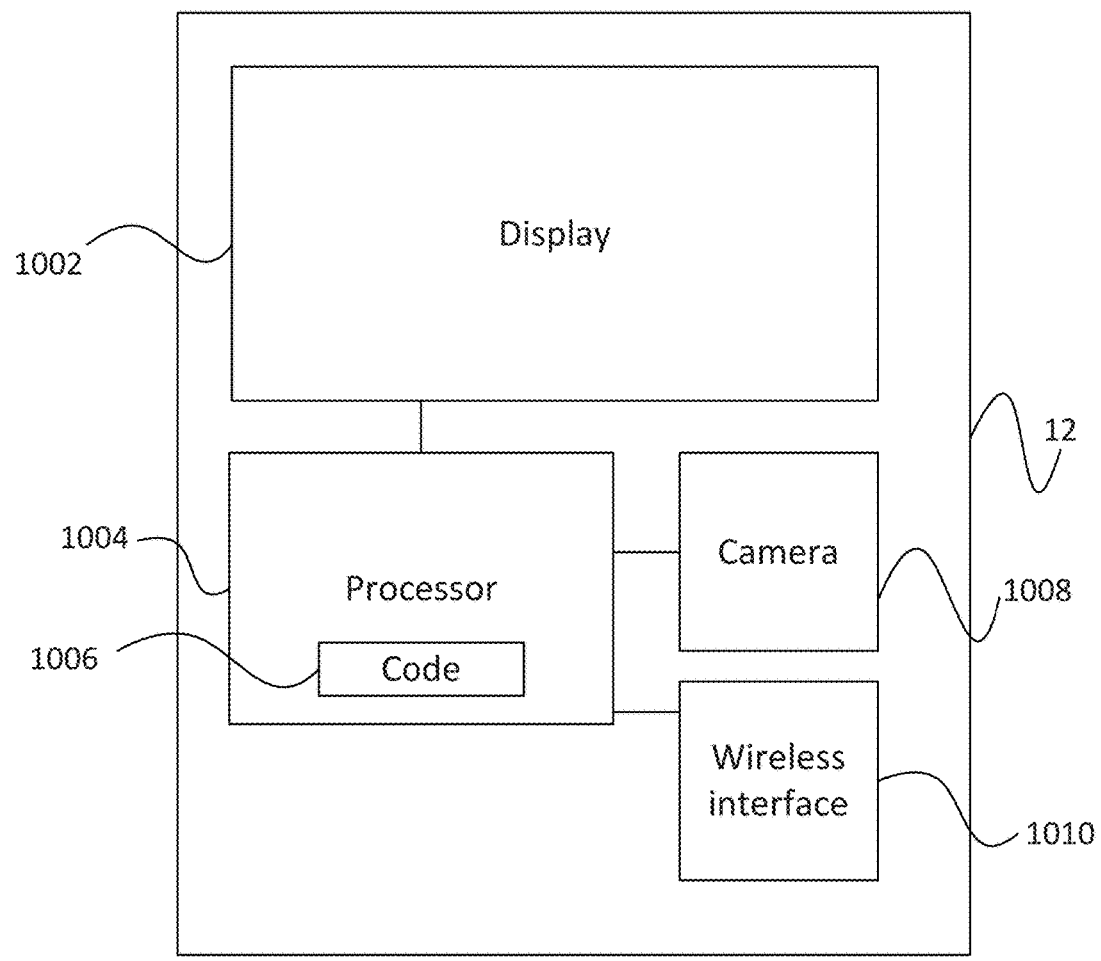
FIG. 10 shows a block diagram of a user device.

FIG. 10 shows a block diagram of a user device 12 (e.g. a smart device such as a smartphone or tablet). The user device comprises a processor 1104 executing digital identity software 1006, e.g. in the form of an application or "app" (uPass app/verification application), and to which is connected a camera 1108, a wireless (e.g. NFC, Bluetooth) interface 1010 and a display 1002 for outputting visual information to a user of the device 12.

Qualification for a Restricted Activity

One of the most common uses of photo ID is to confirm that a person meets the minimum legal age for a particular activity they wish to perform, such as entering a nightclub or purchasing alcohol. The uPass system is particularly well-suited to such a purpose as a client verification application 50 (see FIG. 1a) executing on a smartphone or tablet can be tailored both to answer the underlying query "is this person old enough" and to provide a photo confirmation that the person presenting credentials is in fact the person these credentials belong to. In the following description, the focus is on the precision of a photo.

A number of use cases are discussed later. One example use case is of a music festival which chooses to offer ticket-less entry via uPass. In this scenario an attendee (bearer) offers their credential (the credential 30 they received from the registration process) on their mobile device and the venue operator (validator) checks this against the verification endpoint of the uPass service 14 to confirm that entry may be granted.

There are several ways in which the credential could be presented: a binary blob transferred by NFC; a barcode for scanning; an email address; or, some form of QR code.

uPass Connect

Another use case of interest is that of authenticating login to a remote system via a local device which may lack an uPass application, removing the necessity to remember user names or passwords so long as an uPass device (such as mobile device 12) is available. In this scenario a validating device associated with an uPass scans a QR code displayed on the login form transmitted from the remote system to the local device and uses this to establish a user system. This technique can be used to establish that the owner of the uPass device is permitted to log-in, but can also allow that owner to be confident that any content they receive from the remote system carries from a valid source.

Figure 2:
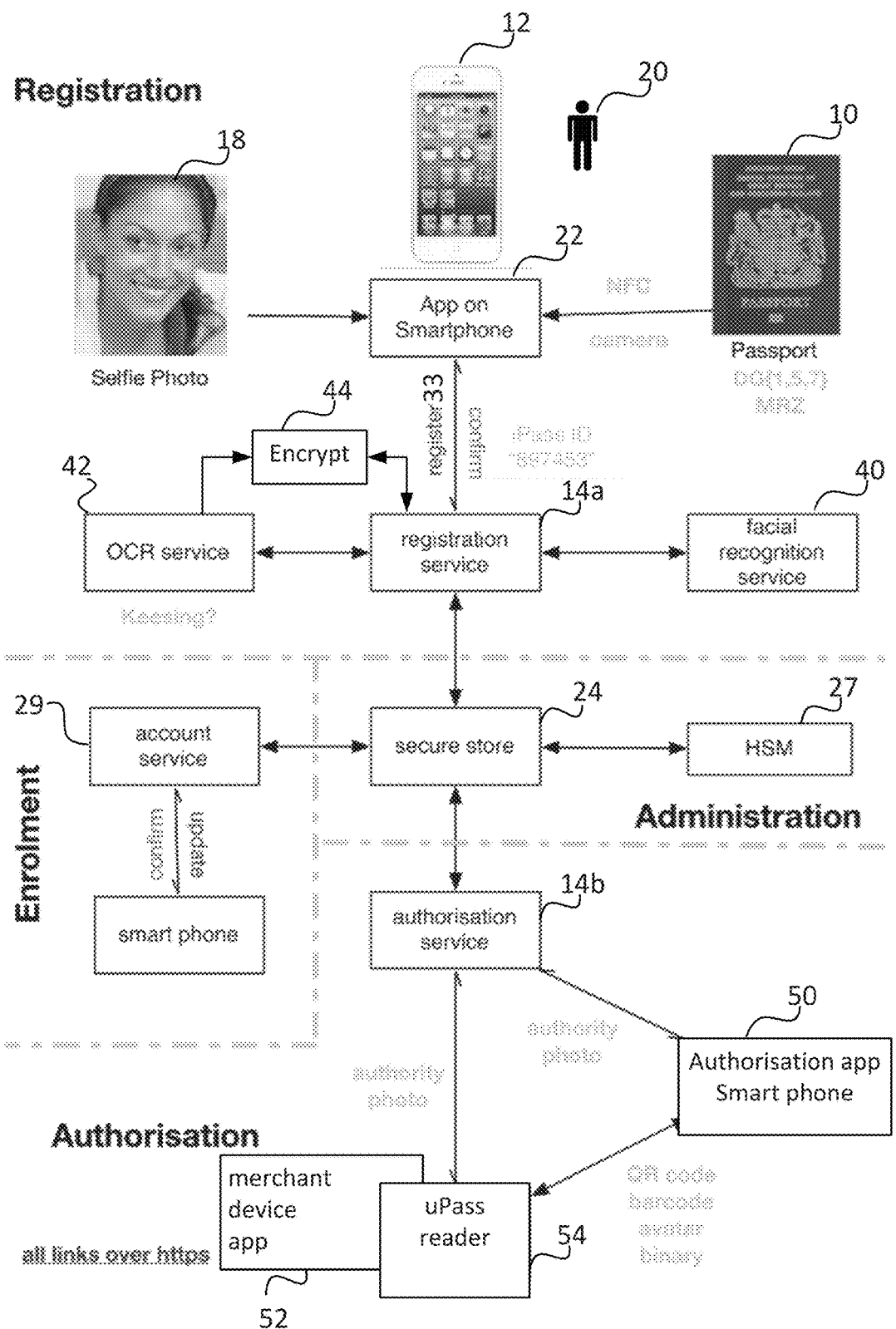
FIG. 2 is an expanded schematic diagram of functional components of a digital identity system.

FIG. 2 is a schematic block diagram of the architecture of an uPass system as functional blocks, illustrating the workflows in the system.

A registrant 20 uses an app 22 on their smartphone or tablet 12 to capture details from their passport 10 (e.g. via NFC and/or camera) and combines this with a photo 18 of themselves (a "selfie") captured with the same device to produce an electronic registration message 23. This is despatched securely to the registration endpoint 14a of the uPass system 14 which performs necessary processing (facial recognition/OCR) to extract relevant data and create an account for the registrant, as described later. Upon successful completion a confirmation message is returned to their device along with an authentication token (credential) creating a link to the new "published" uPass identity profile.

Contingent Trust

A feature of the uPass system is that a photo is provided as part of the "published" profile linked to the credential. However, the display of a photograph when a uPass credential is presented in a verification process only confirms that the registered user's claimed identity matches that of the person who registered the uPass in the first place, not that the registered identity is itself a valid and trustworthy record of the registrant's identity.

To address this an embodiment of the described technology introduces the concept of contingent trust, whereby a user's identity profile has an associated profile confidence value "$CV1$" n for 2,3,4 based upon the quality and source of identity documents associated with it, and its historic usage. The way this works in practice is that the multiple sources of identity data are allowed, and for each a level of trust is assigned. Responses can then be qualified where legally required.

For the purpose of explaining contingent trust, in the following, it is assumed that the identity document to be ingested is an electronic passport with the option of either an NFC interaction, an OCR-quality scan or both. In practice, the digital identity rests on primary information data items such as name, age, nationality and photograph to minimise compatibility issues.

The hierarchy of contingent trust identifies five natural levels of confidence based on the manner in which the registration data enters the system:
 presented in person to a trusted agent who confirms that it matches the presenting party;
 a trusted mobile application with additional safeguards;
 a trusted website;
 submitted via registered post;
 no registration documents The first case sets a maximum confidence level for contingent trust. The exact value assigned can be determined by statistical analysis of the risks involved, but as a rule of thumb should be no higher than 95 percent (no data should ever be considered incontrovertible). The exact number can vary depending upon the trusted agent concerned.

An uPass can become trustworthy as a result of manual verification in this manner. So "trust" is just a fixed value based on initial registration but can vary as a set of propositions regarding the registration process for each of the multiple anchoring documents.

Additional checks can be applied to improve the standing (confidence value) of an uPass such as:
 endorsements by existing uPass users;
 NFC data reads in a trusted environment;
 random solicitation of document presentation to a trusted agent;
 random direct contact via video call to confirm uPass registrant still has registration documents Confidence of the face verification grows with time. When users sign up they do so with their face and a passport. At this point in time there may be a very low confidence that they are who they say they are (though this depends on any anchoring document(s) they provide). Thereafter, image database is captured with every face login. Every time capture another selfie is captured it is added to an image database. These selfies are combined into a single Face Identification Record. The key here is that they are captured over time in a variety of different lighting conditions (because they are captured on a phone or other smart device)—and when combined provide more accurate results. In embodiments, the current facial record (which could be made up of a number of the most recent selfies, e.g. a small number such as 5) with the original passport photo captured at sign up.

Where a trusted anchoring document such as a passport is used at sign up, the confidence value is reasonably high but can still grow over time in this manner.

Confidence of the whole system also grows over time, due to other factors such as peer to peer verification. An important feature of the present system lies in the following combination of trust anchors:
 a) phone;
 b) selfie;
 d) peer to peer validation.

A given confidence value is represented as a fixed point variable, to which a (variable) value between e.g. 0 and 1 (0% and 100%) is assigned.

User Profiles and Privacy

A registrant is providing personal identifying data items to allow an uPass credential to assert their identity at a later date. By its very nature this identifying data is confidential and the uPass system provides means by which it can be handled with the level of privacy which an uPass user will consider appropriate to the circumstances in which it is being used. To facilitate this an individual uPass (digital identity) has a number of profiles associated with it.

Figure 3A:
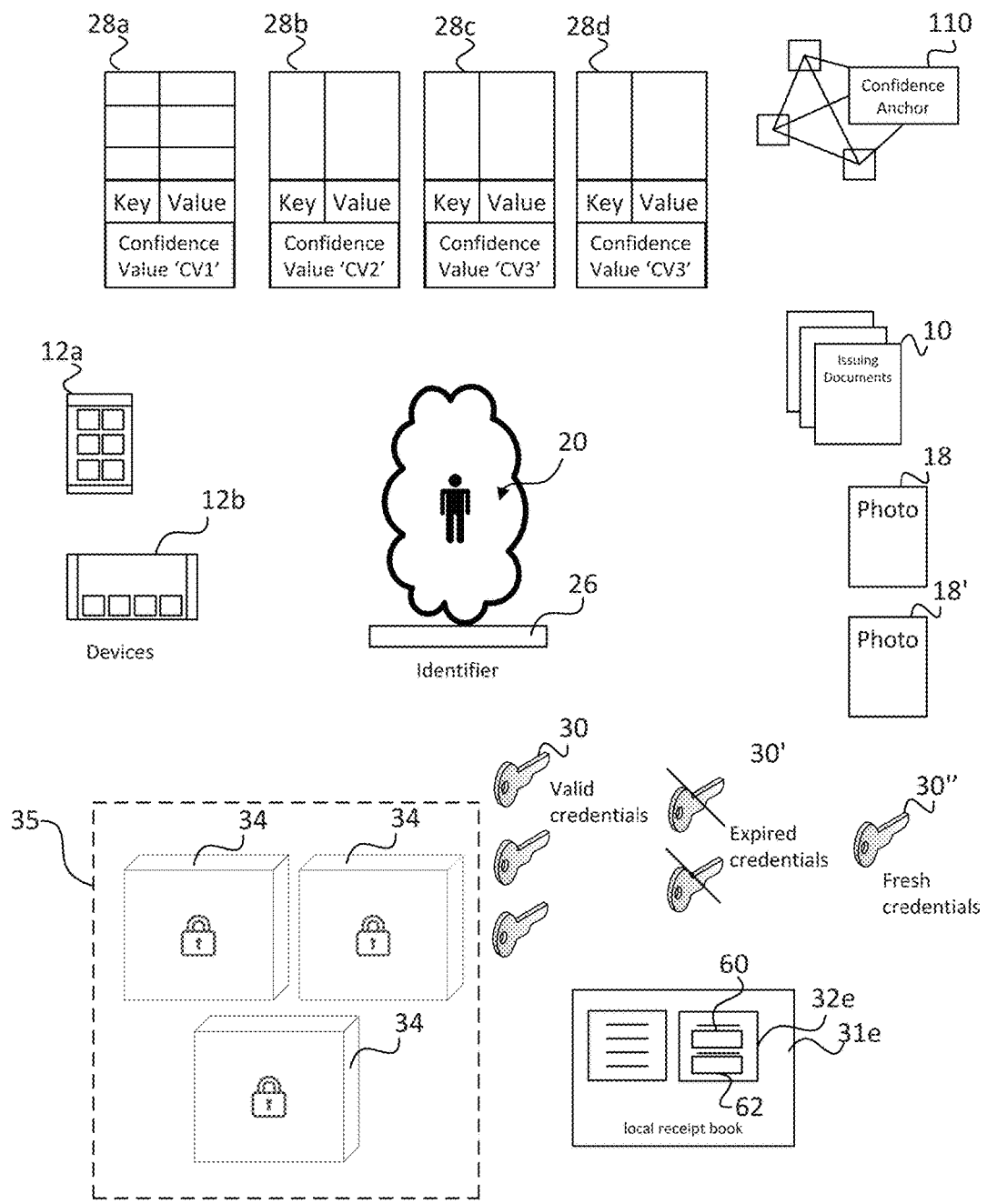
FIG. 3a is a schematic block diagram of data items stored as part of a digital identity system.

Reference will now be made to FIG. 3a to explain the nature of an "uPass" or in other words a digital identity which is created for a user and which can be verified. FIG. 3a shows diagrammatically the components which make up an uPass for a person 20. These components are stored in electronic storage of a suitable kind in the uPass system. For example, each user 20 can be associated with a database or part of a database attached to a unique identifier 26 which identifies components of the uPass for that person. For example, the electronic storage can take the form of a secure store as denoted by reference numeral 24 in FIG. 2. Thus, each person 20 is associated with a unique identifier 26 which is associated with all components of the uPass for the user 20. The digital identity comprises a set of digital profiles 28a, 28b, 28c, 28d. Each profile comprises one or more key value pair, where the key identifies the nature of a data item which is stored in the profile, and the value identifies the data item itself. For example, the key may be "photo", and the value would be a photograph of the user. In fact, the value may be an address where a photograph is stored as a separate component of the uPass (see 18, 18'). Although shown schematically as individual blocks, the profiles can be constructed from linked lists of key/value pairs and confidence values, with each item in a list pointing to its ancestor. Each time a profile is "published" (described later), a new "head" of the list is created, incorporating modifications arising from use of the profile.

Another component of the uPass are the one or more anchoring documents which have been utilised to provide data items for the profiles. An example of an anchoring document is the passport 10. Multiple different anchoring documents may be stored.

As mentioned above, on successful registration, a confirmation message 25 is despatched from the registration service to the app on the smartphone including a credential. Each time a data item is added to a profile, or an uPass profile is utilised, a new credential is created for that profile and transmitted to the owner of the profile. These credentials are stored in association with the identifier 26 in the uPass for the person 20, and are bound to a profile. A new credential is one modification arising from "publishing" a profile . . . . As the credentials are used for "unlocking" the profiles, they are shown as keys 30. In practice, each credential is a unique random digital string which keys into a database, described later with reference to FIG. 3b.

Each user 20 is associated with one or more smart devices (such as a smartphone or a tablet), shown as 12 and 12a. Metadata about these devices is stored as part of the uPass for the user. Each time a transaction is conducted using an uPass, a pair of receipts is issued. This will be described in more detail later, but suffice it to say that an audit trail of receipts is stored in a local receipt book 31e as part of a user's uPass. These receipts are illustrated diagrammatically by reference numeral 32e.

Each enrolled device 12a, 12b has its own local receipt book on the device or on a remote server accessible to the device.

Figure 3C:
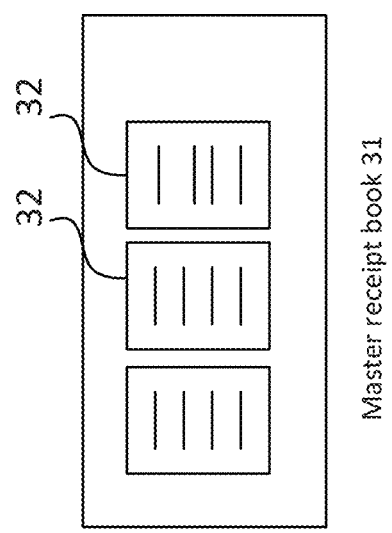
FIG. 3c shows a master receipt book of a digital identity system.

A global master receipt book 32 (FIG. 3C) holds master receipts 31, which relate to (individual) receipts 32e in the manner described below. Individual receipts issued to an entity which is a bearer or validator are labelled 32v and 32e herein respectively.

As part of the authentication procedure which will be described later, when a valid credential is presented to the uPass system 14, a profile will be published according to the nature of the credential which is presented. These published profiles are shown under reference numeral 34, and are illustrated diagrammatically with keyholes which represent that a key corresponding to a credential can be utilised to unlock these profiles for publication. A profile is published by being made accessible in an addressable storage location in a memory 35 (e.g. a cache) having an address bound to the credential.

A generated credential can be stored at the uPass system, which is appropriate if it is entirely random. The stored credential is compared against a presented credential, and the profile to which the credential is bound unlocked only if the stored credential matched the presented credential. However, when the credential is generated using certain "ingredients" (such as a random sequence, random number and device metadata, such as a device identifier), it is generally more efficient to store the ingredients instead as these generally have a lower bit-size than the credential itself. The ingredients can be used to generate a copy of the credential for such comparison. For example, the credential can be generated by hashing a random seed and device metadata (e.g. which is or comprises a device identifier) a random number of times—the uPass system can store the metadata, seed and random number to create another copy later.

At the time of registration three (or four) default profiles are created:
- an anonymous profile 28a which asserts uniqueness of identity and presents a photo for visual inspection;
- a photo ID profile 28b which also presents the name as listed on the registration document;
- a majority profile 28c which adds date of birth to the photo ID;
- (and an optional fourth) a nationality profile 28d which add nationality to the photo ID Additional profiles can be created for the user which allow them to have additional personal information added or present their personal information in different ways. These profiles can be attached to them by any other user as a result of a valid uPass transaction. A profile solicitation application is used to allow for an uPass user to get another user to publish a profile on their behalf. No one can create a profile on their own behalf. Note in this respect that the uPass system comprises a controller 116 which acts as a third party to issue uPasses based on anchoring documents.

When new personal information is entered into a profile without the support of a registration document that profile is given the lowest level of contingent trust. For example, a third party could be an employer who enters data items into a profile solicitation application for an employee. A credential is created for the employee based on information provided by the employer, the credential is bound to the profile, and provided to the employee. To improve upon the level of contingent trust, the system allows for the uPass user to have the profile validated by other uPass users, creating a web of confidence which can be inspected. This occurs each time the owner of an uPass uses his credential in a validation procedure. The web of confidence for each profile is a social graph in which each node represents a confidence anchor. These are discussed later. The level of contingent trust placed in the document will be a function of the number and quality of validations the profile receives.

Figure 8A:
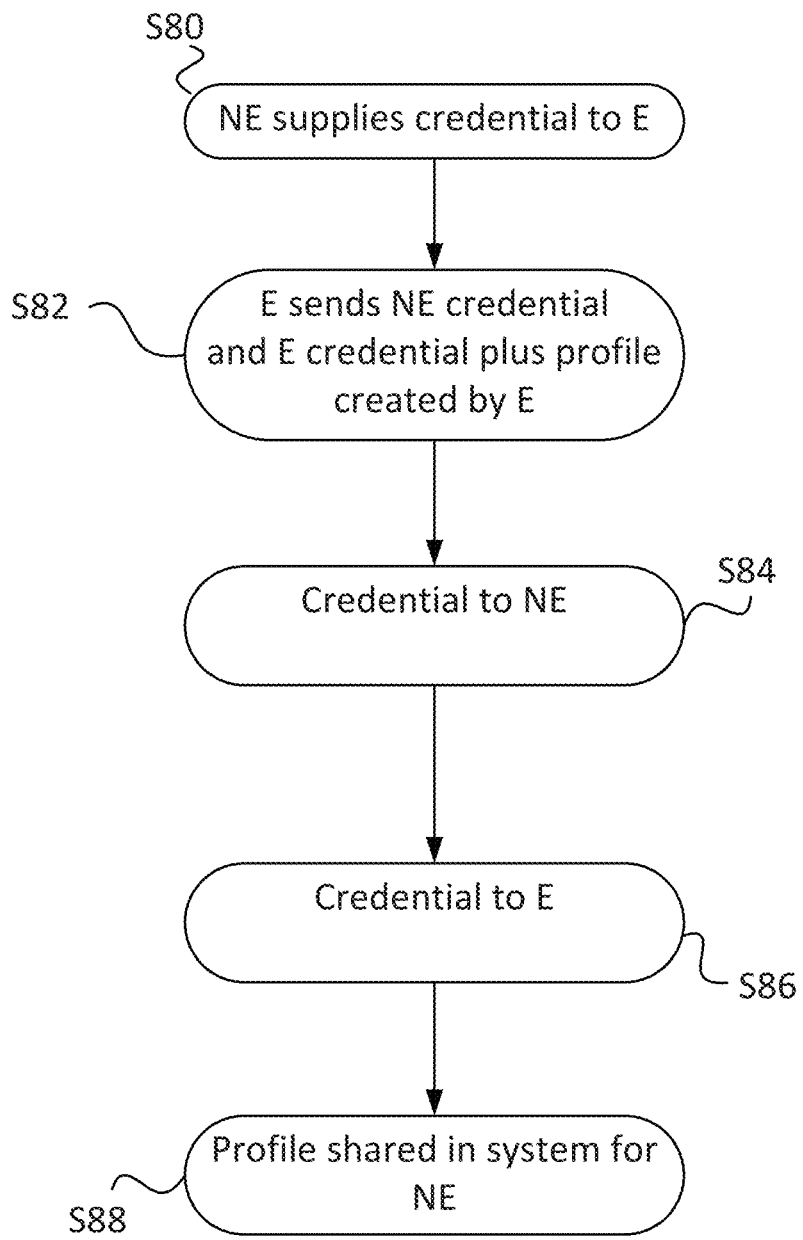
FIGS. 8a (flow chart) and 8b (signalling diagram) describe a situation where a person registered with a digital identity system wishes to have a profile assigned to them by a third party.
Figure 8B:
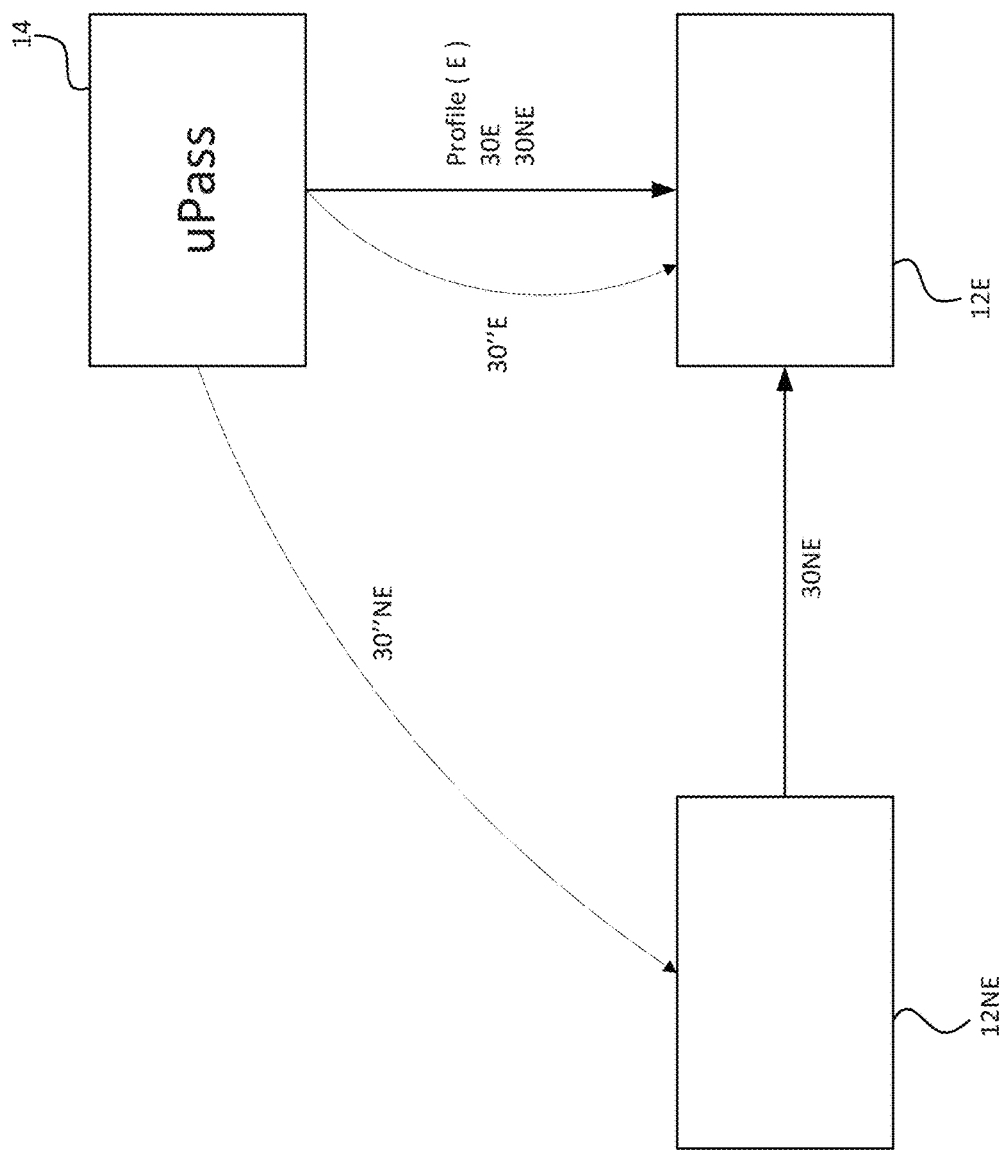

Reference is made to FIGS. 8a and 8b to describe a situation where a person wishes to have a profile assigned to them by a third party. In the particular example which is given, the person is a new employee, and the third party is his employer. The new employee wishes to have a profile assigned to him by the employer. There are many other situations however where a person may wish to have a profile assigned by a third party. In the circumstance of FIGS. 8a and 8b, it is assumed that both the new employee NE and the employer E are already registered in the uPass system and have active credentials. In Step S80, the new employee supplies his credential 30 NE to the employer. In FIG. 8b, the new employee device is labelled 12NE, and the employer device is labelled 12E. In Step S82, the employer sends the new employee credential 30NE and his own credential 30E to the uPass registration service 14. In addition, the employer sends in that message a profile which he has created for the new employee. The uPass service checks that the new employee and employer credentials are valid, and if so, creates a profile for the new employee based on the information provided by the employer, and finds a new credential 30"NE to that profile. That new credential is then sent (Step S84) to the new employee device. The uPass service 14 also sends a replacement credential 30"E to the employer device, because the employer has now used up his one-time only valid credential when he sought to assign a profile for the new employee.

The profile is then stored in the uPass system (Step S88). It will be appreciated that although shown in sequence, Step S84, S86 and S88 can be carried out in any order or in parallel.

Figure 9A:
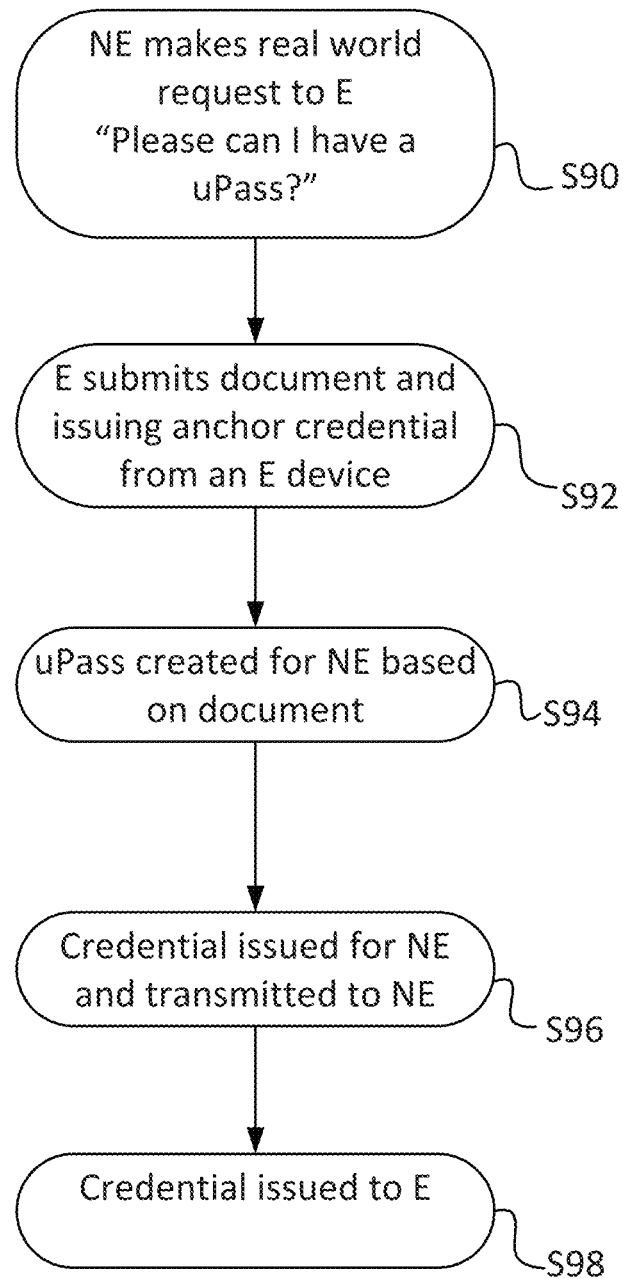
FIGS. 9a (flow chart) and 9b (signalling diagram) show a case where a person not registered with a digital identity system wishes to have a profile assigned to them by a third party.
Figure 9B:
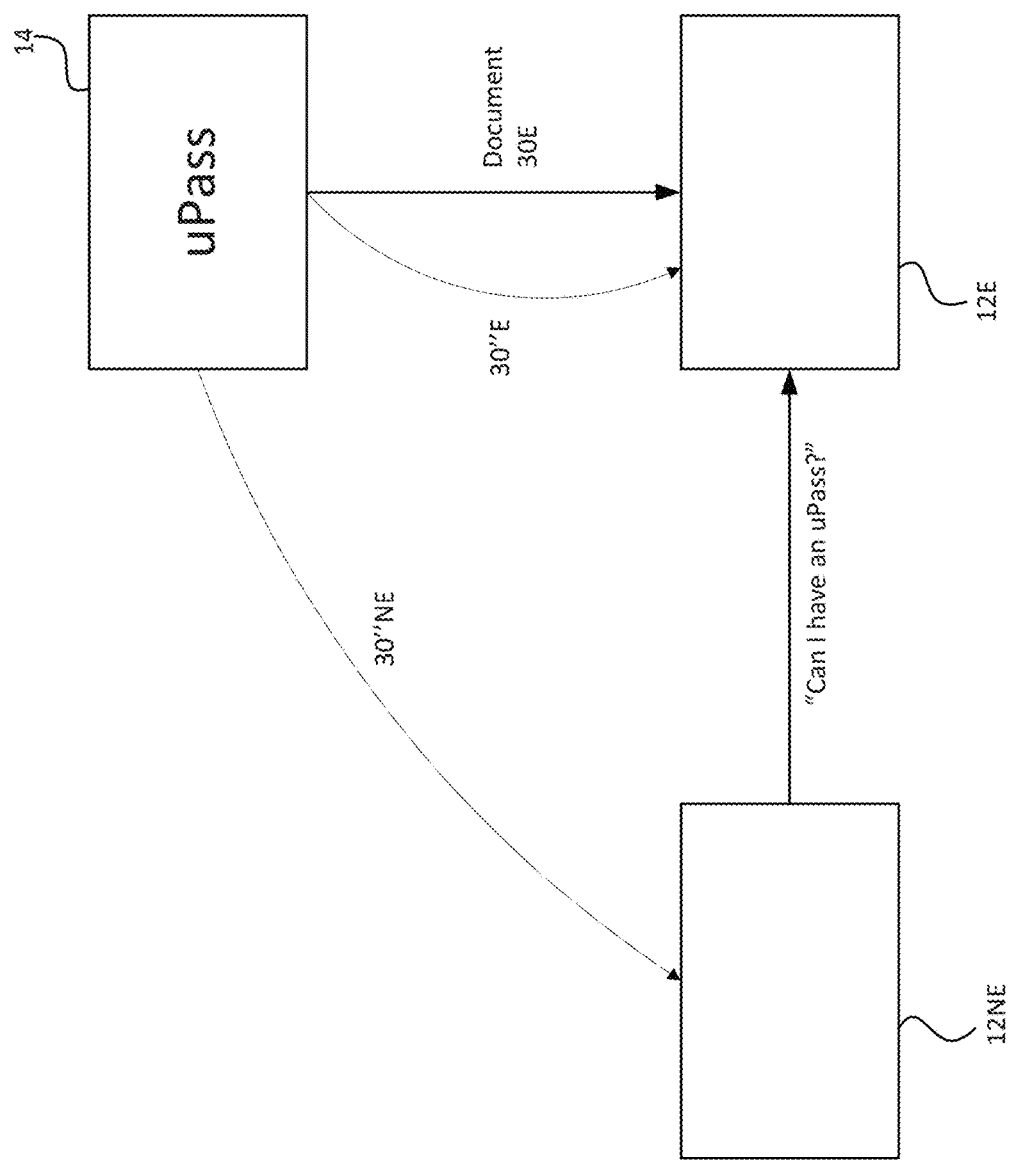

FIGS. 9a and 9b show the case where the new employee is not already registered with the uPass system. In this case, in Step S90 the new employee makes a "real world" request to the employer "Can I have an uPass?" This could be done in person, by email or text, or in any way. The employer submits to the uPass registration service 14 a document which is going to be used to anchor a profile for new employee. In addition, the employee sends his credential 30E. In this case, it may be necessary to determine the authorisations attached to that credential, and to confirm that the employer has a credential which allows him to create uPasses for a third party. Note that this is one level higher in authorisations and assigning a profile to someone who already has an uPass. The assignation of a profile does not imply any particular validity to the uPass itself. However, creation of an uPass does imply a certain validity, although of course the confidence level which is attached to the uPass can be varied depending on the issuing anchor (in this case the employer). In Step S92 the employer submits the document and his credential to the uPass registration service 14. The uPass service creates an uPass profile for the new employee, using the document as the issuing document and with a confidence level associated with the issuing anchor. A credential is bound to each profile associated with this uPass, and the credential associated with the anonymous profile is sent to the new employee as shown in Step S96. If the new employee device has not been enrolled and is not known to the uPass, some appropriate arrangements are made to supply the credential 30" to the new employee device. In Step S98 a replacement credential is issued to the employer.

FIG. 2 illustrates an account service 29 which provides a means of managing an uPass, including enrolment of devices and specification of user authorisation profiles.

Authorisation Profiles

As outlined earlier, an uPass profile consists of personal data and a photograph which can be used together as a cohesive identity. Each uPass credential is anchored to a profile and an uPass user can have more than one credential active at any time. However, only one credential can be active at any specific time on any given device.

Each profile available for use with an uPass account must be assigned to it by a third-party Document Issuing Authority, of which the uPass system controller itself is an example. When an uPass account is created it has at least three profiles assigned to it by the uPass system:

1. an anonymous profile 28a which can be used to assert identity but reveals no information;
2. a majority (age check) profile 28b which reveals the uPass user's date of birth;
3. a name profile 28c which reveals the uPass user's name as presented on their registration documents.

Whenever credentials are transmitted to a device they are always bound to a specific profile in the database in FIG. 3b and the anonymous profile is the default profile for interactions unless otherwise specified by the uPass user.

To change profile credentials the uPass user must perform an enhanced authentication with their current credential against the uPass enrolment service to acquire a list of currently available profiles for their account. This does not need to be done for every change of profile as the information might be cached locally in an uPass application, so that the list only needs to be regenerated when new profiles are attached to the uPass account or the old profiles are removed.

Once a list of profiles is available then changing between these profiles can be performed using a standard authentication with an existing credential, which is replaced with a new credential bound to the desired profile.

All changes of profile result in security logging in the uPass system.

Profile Structure

As shown in FIG. 3a, a profile consists of a set of key value pairs. Either can be considered an arbitrary binary field. A set can be one or more key value pair.

Recognisable Anonymity

The base on which all other profiles are constructed is the Anonymous Profile 28a which confirms that its bearer is an uPass user and provides as its data item a current photograph. When the profile is published to a third party, it allows the third party to confirm by visual inspection that the bearer of the uPass is indeed the person for whom it is valid. A profile is published in the validation procedure described later.

The idea of querying an anonymous credential to ascertain identity may seem strange, however in an embodiment of the described technology the uPass system accompanies the assertion with a receipt allowing the validating party to indirectly and anonymously reference the uPass which has just been validated.

Assigned Profiles

The power of an uPass lies in the ability of its owner to present different views of their identity or rights in different circumstances. To avoid abuse, several restrictions can be imposed:

1. profiles for any uPass account can only ever be created by third parties, noting that the uPass controller 116 is a third party in this respect;
2. when a profile is being created it must be created for a specific uPass account;
3. the assigned profile is bound to a specific profile in the creator's account (in this way, a creator's profile becomes a confidence anchor 110);
4. and is assigned a characteristic tag by the creator;
5. once created the profile cannot be edited;
6. however it can be deleted or replaced by its creator;
7. and when used the creator of the profile is always announced to the validator;
8. which allows the chain of trust right back to the uPass system to be interrogated.

The characteristic tag can be used to distinguish profiles from one another. For example, each tag could call a visual indicator to be displayed on the mobile device.

Profiles and Privacy

Once a profile has been assigned to an uPass account the owner of that uPass account must actively choose to use the profile in a validation for it to be available to another user. That is, the credential created from that profile must cause a link to that profile to be sent to a validator. A user can have more than one profile, hence more than one credential, stored in the same or different devices, i.e. there is only one credential per device per person. [where there is more than one profile, a user can distinguish between them by the visual indicators of the characteristic tags.]

The creator of the profile may explicitly require the use of that profile when performing a validation, in which case if any other profile is used the validation will fail. This ensures that for as long as the assigned profile exists, the uPass user can only validate their identity with that profile and that use of any other profile will be rejected. This is described later in connection with uPass Connect.

There is no way for a third party to enumerate all the profiles associated with an uPass account.

Profile Storage

Profile information lives in two places. The underlying data is versioned and retained in the secure store 24 whilst the current state of profile data is published in a secure key-value cache 35. This is an important underlying security premise of the Upass system—third parties are not given any access information to the secure store 24 itself.

Profile Publication

A profile contained in the secure store 24 is published (at a location in memory 35) whenever a credential is bound to it. The published profile has certain properties:

expiry time.
Photograph or a link to a photograph;
Encrypted profile content (key/value pairs etc.);
Random symmetric key;
A URI resolving to the encrypted profile content;
A URI resolving to the creator of the profile Every time publication occurs the profile content is encrypted with a different randomly generated symmetric key 60, and then stored at a location in memory 35 accessible via a generated URI 62.

Vouchsafing

Each uPass account is capable of attaching profiles to other uPass accounts, allowing people to annotate each other with nicknames and other social information as well as vouching for the reliability of that information. As such each uPass itself is an example of a Document Issuing Authority with low confidence of reliability.

When an uPass user attaches a profile to another uPass user, the attachment is anchored against an existing profile (confidence anchor 110) on their own uPass account.

Aside from attaching a profile to an uPass account, uPass users can vouch for the veracity of a profile attached to another account at the request of either the profile creator or the profile recipient. As the number of uPass users willing to vouch for an assigned profile increases, so too does the confidence which can be placed in the information contained in that profile.

Document Issuing Authorities

Vouchsafing provides a means by which uPass accounts can be annotated with profiles, however, these are potentially low-quality sources of gossip rather than anchored identity statement. An authorised Document Issuing Authority is a recognised source of high-quality identity information anchored to real-world documents.

Once an uPass user becomes a Document Issuing Authority they are allowed to solicit information from an uPass user and use this to annotate uPass accounts at a higher level of confidence than that afforded by the standard vouchsafe mechanism.

Lifecycle

Whilst uPass credentials are anchored by a passport 10 they can be caused to expire when the passport expires. This requires that uPass users be advised to update their registered documents as soon as their new passport is issued to ensure continuity of service.

An eight week notice period can be provided when the registered passport is due to expire to allow for the variable turnaround time.

When support is implemented for other identity documents the situation will become more complex. Each document will contribute to the contingent trust of the uPass and whilst this is above a certain level the uPass will remain active with regular warnings to the user regarding pending and actual document expiry.

Use

The initial scenario for uPass usage revolves around face-to-face encounters where a passport or equivalent document would be used to support identity.

Whenever an uPass bearer wishes to authenticate their identity they must present a credential (e.g. a QR code) generated from a unique random identifier provided by the uPass system. The recipient of this credential is an uPass Validator who authenticates themselves to the uPass validation service each time they validate the information received from a Bearer. Following validation the Validator decides how to proceed.

Deletion uPass users may wish to delete particular profiles or their entire uPass identity and this is supported by the enrolment service. This involves the deletion of all personal data and device identifiers and the expiring of all issued keys.

There may be a legal requirement to maintain the auditing metadata associated with an uPass identity for a specified period of time, so deletion may involve a deferred component.

Suspension

When an uPass user sees misuse they can report the offending user and a suspension of the account will be imposed whilst the matter is investigated. The uPass system can provide a 7-14 day uPass suspension. When suspended, an uPass should return that the uPass identity has been suspended.

Suspension cannot occur without audited intervention and an investigation into the reasons for the suspension may be performed. Mechanisms and procedures for this are outside the scope of this document but should clearly be proportional and designed to minimise or prevent malicious suspension.

Revocation

When there is the suspicion of serious misuse, an uPass may be revoked. Revocation is similar to deletion but there may be a need to record additional information about the user to prevent them from re-joining uPass within a set period of time.

Expiry

At certain infrequent time periods (governed by expiration time 68) an uPass User may be asked to create a new uPass.

If all of the anchoring identity documents for an uPass user expire, this should automatically trigger a request to issue a new uPass.

Multiple uPasses

Users may have more than one uPass account at a given time however the implementation of multiple profiles within an uPass should reduce the extent to which this occurs. For example a married woman who wishes to use an uPass in both her maiden name and married names could do this with multiple profiles on a single uPass rather than needing multiple uPasses.

Device Enrolment

Each account may have one or more devices 12*a*, 12*b* associated with it at any given time. To enrol new devices into an uPass account, an audited validation transaction must be performed between this device and a device which is already enrolled for the uPass user's account.
1. Take a selfie;
2. Standard credential swap between the two devices (this means the validation app 52 on one device scans in the credential 30 offered by the other device, and vice versa);
3. When a new device goes online, server asks if the credential is valid;
4. If the credential is valid then the new device is enrolled.

Device Re-Enrolment

If the uPass account has at least one other associated device with a valid credential then re-enrolment follows the process outlined above for device enrolment.

uPass Account Recovery

If the uPass user still has possession of a device which has been enrolled then account recovery is performed the same way as device re-enrolment with invalidated credentials. Otherwise, the uPass user can re-register using any registration document associated with the account.

Device Revocation

An uPass user may revoke authorisation for any device currently enrolled for their account. This will invalidate any credential they currently have associated with the revoked device.

Device revocation does not necessarily result in uPass suspension.

Two Factor Registration

As mentioned earlier, each digital identity has data items derived from identity documents in a registration process. When obtaining data items from registration documents, one might assume that transmitting both the NFC (near field communication) and OCR (optical character reader)—quality data would be sufficient to confirm that the passport data is valid, however the acquisition of both sources of information via the same device leaves no way to confirm that the data has not been tampered with prior to transmission. To do that a second transmission vector may be utilised preferably involving a trusted agent and/or data acquisition device, and some form of standardised registrant signature which can be audited.

In one embodiment of the registration process, the registrant submits a photograph of the registrant taken with the same device used to capture registration data, time-stamped and tagged with metadata comprising device type, operating system, geolocation and network address. The same metadata will be captured for each item of registration data captured using the device.

This photograph and the associated metadata provides an audit trail which can be used to help identify fraudulent registrations. A percentage of registrations are manually checked at the time of submission to ensure a visual match between the photograph and the photographic element of the registered identity document (e.g. passport photo).

Preferably, a facial verification service 40 compares these photographs in all cases and where there is a low level of confidence that the photos depict the same person this will also be flagged up for manual visual inspection. Rather than a single static photograph, frames taken from brief video clips can be used to capture a sense of liveness. In some embodiments, only a single frame is taken as it has been found that using multiple frames does not improve the accuracy of the face verification software.

Data captured by the device camera is subject to OCR processing 42 when it reaches the registration service 14a at the uPass server, to extract data items from the identity document.

A digital signature is generated on the sum of unencrypted data. Each captured data item is encrypted by encrypt block 44. The digital signature is used to annotate each separate encrypted data item before it is submitted to the registration service. These encrypted data items are decrypted by the registration service and the digital signature checked, ensuring the integrity of the entire registration submission.

In one embodiment, to further strengthen integrity the distinct registration data items are transmitted to separate end points identified by the registration application 22 and encrypted with separate symmetric keys. As with all symmetric keys issued by the system these are one-time pads—keys used only once and therefore known to be unique.

To implement the two-factor authentication system the registrant requires a smartphone 12 with Internet access, which is capable of communicating over HTTPS and includes a camera of reasonable (say 5 MP) quality. NFC capability is a useful optional extra.

The Registration Process

Figure 4A:
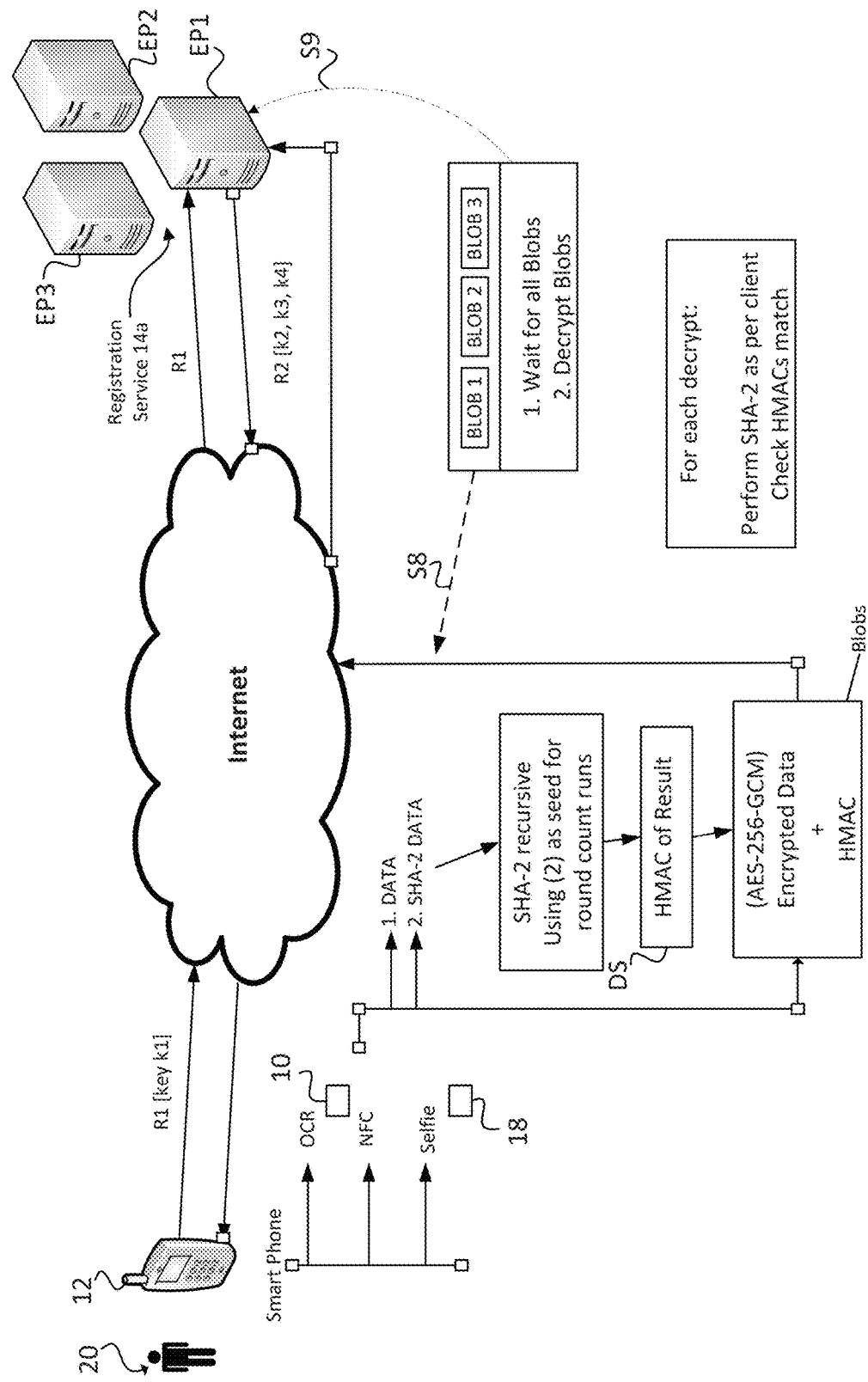
FIG. 4a is a schematic flow diagram illustrating the creation of credentials in a digital identity system.
Figure 4B:
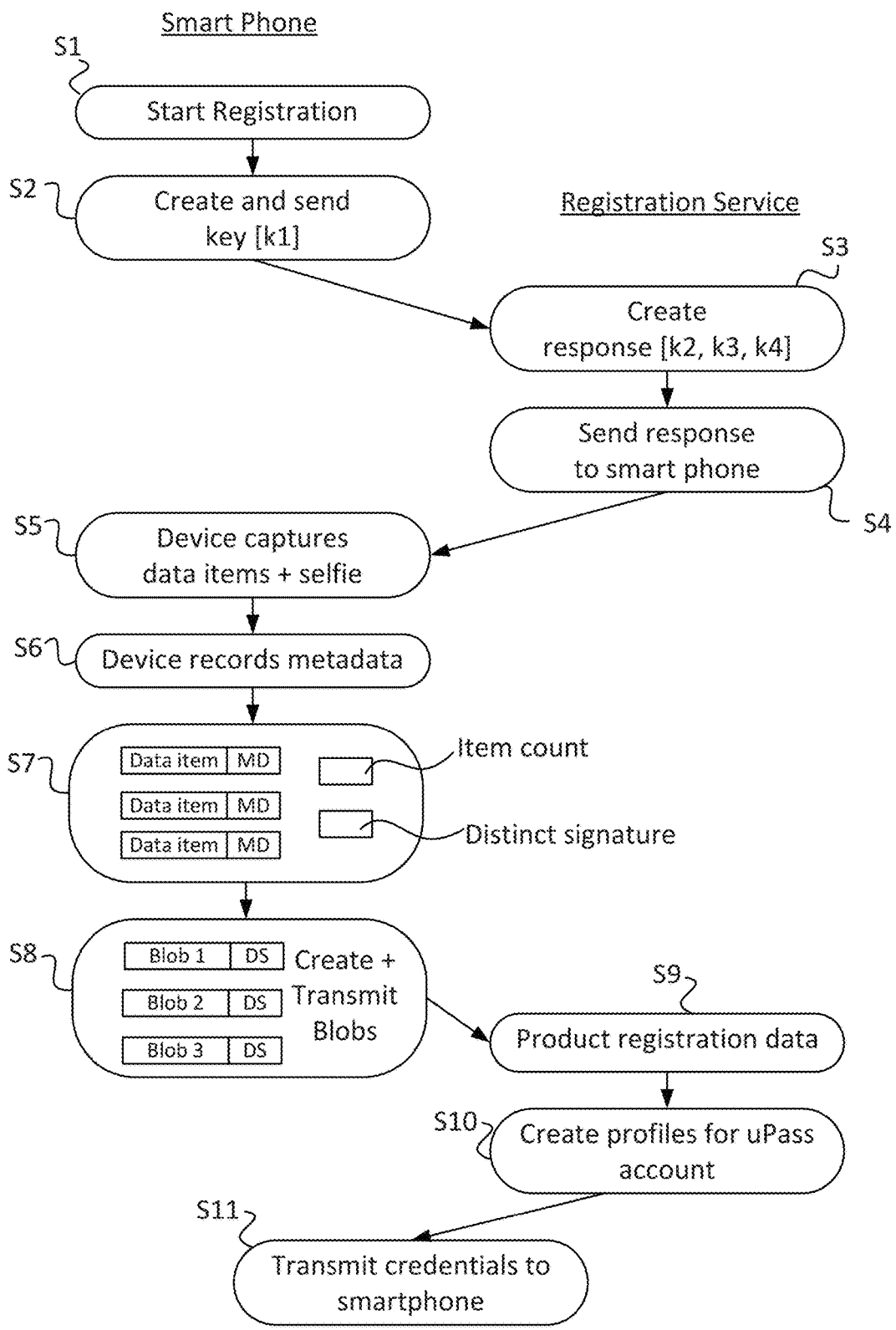
FIG. 4b is a flow diagram showing the flow conducted at a smartphone and registration service of the creation of credentials in a digital identity system.

The registration process will be described with reference to FIGS. 4a and 4b based on the use of mobile device 12 such as a smartphone or tablet with a native application. This application will acquire the necessary photos, NFC and metadata for packaging and submission to the registration service. The registration workflow comprises the following steps:

S1/S2. Registrant 20 initiates a registration transaction by activating an icon on the smartphone 12, which creates (S2) an electronic message R1 containing a random symmetric key k1, of at least 256-bit, to be sent over HTTPS to the uPass registration service 14a. The preferred symmetric algorithm is AES-256 operated in GCM mode.

S3/SS4 The registration service 14a sends a response R2 encrypted with the registrant's key:
  1. three unique 256-bit symmetric keys k2, k3, k4;
  2. three distinct round-counts.
  A round-count is a positive integer which tells the client how many times to iteratively perform a function seeded with a data value of interest. In this case we use the round-count to specify how many iterations to perform when generating a SHA-2 hash value which is a defence against rainbow table attacks.
  This response R2 is packed in a cookie marked with the HTTP only and HSTS flags;
S5. The registrant uses their device 12 to capture data items for a registration request:
  1. device performs optional NFC chip read;
  2. camera captures:
    1. scan of identity document;
    2. photo of registrant (selfie).
S6. Metadata comprising timestamp, IP address and geolocation is recorded;
S7. This is then appended to each data item to be submitted along with the item count;
  a digital signature DS is generated for the registration request using HMAC.
S8. Each data item is encrypted with one of the symmetric keys k2, k3, k4 to create a respective BLOB;
  the distinct signature is appended to each encrypted item;
  the registrant agrees to the uPass Terms and Conditions of Service;
  each encrypted item is despatched to a separate network endpoint EP1, EP2, EP3. [
S9. BLOBS are collected in the registration service 14a;
  geocodes and IP addresses are checked for each data item;
  if all checks pass then the registration data is processed (see FIG. 5 for a digital passport format):
    1. passport scan passed to OCR service to extract MRZ, photograph and signature;
    2. NFC data provides DG1, DG5 and DG7 (MRZ, photo, signature);
    3. extracted photos are compared to the registrant selfie by the facial recognition service 40.
S10. If everything matches then an uPass account is created with:
  1. an anonymous profile 28a;
  2. a photo ID profile 28b;
  3. a majority (age indicating) profile 28c;
  4. a nationality profile (figure element**).
S11. uPass credentials are provided to the registrant application for the anonymous profile (the default profile). A credential is a random digital sequence valid for one time use only—it can be embodied as a QR code 16 for example.

The registration service 14a is supported by an in-memory cache 24 in the secure store which contains a working-set of data elements related to current active registration for transactions, including:
1. for the IP address of each active client registration
  1. device ID;
  2. symmetric key;
  3. registration data [k1]:
    a. registration symmetric keys [k2, k3, k4]
    b. encrypted registration data items received;
    c. decrypted data items.
  4. account creation message;
  5. account credentials For enhanced security, there may be a requirement imposed that the data is transient and must never be stored to disk.

Each service-provided key is generated by the secure store 24 which ensures that all keys issued are unique. Forging registration transactions is impossible as keys provided by the registration server are randomly generated and cannot be predicted, therefore there is no way to use the keys from one transaction to guess the keys being used by another transaction. The guarantee of uniqueness ensures that attempting to reuse a prior set of keys will trigger a security event.

Once all expected data items for registration have been received and decrypted, the decrypted passport scan is sent to OCR service 42 and the returned data is used as the basis for an account creation message. This is checked against any NFC data received to confirm that the two data sources present the same identity, and if this is the case then the embedded photographs are compared with the registrant's confirmation photograph in the facial recognition service 40 to ensure a visual resemblance.

A percentage of incoming registrations can be manually checked at this stage to ensure that the OCR and facial recognition processes are working correctly, though this is not essential.

If the registration data passes these tests then the account creation message is passed to the secure store 24 where its uniqueness is confirmed. A data store is created for the account containing identity statements, each anchored to its source document, and the three or four initial profiles 28a, 28b, 28c, 28d created for this account.

An appropriate credential 30 is then generated for the registrant's device using the default (anonymous) profile. The credential is stored at registrant's device and allowed access to the profile. The secure store 24 now contains profile records which can be accessed using this credential.

After successful registration the device metadata, e.g. a combination of recorded device type and operating system is used to provide download links for appropriate uPass applications from the user's profile page.

To satisfy some use cases where a merchant seeks verification of a user, the merchant themselves must be registered.

The merchant registration process is similar to the standard user registration process, but using different primary documents.

For the UK jurisdiction a merchant might comprise any of:
registered corporate entity;
sole trader;
partnership;
registered charity;
club;
society.

As a merchant registrant is an organisation, not an individual, there is a requirement to make a distinction between who owns the uPass (the merchant) and who is nominated as an administrator (one or more individuals).

Figure 11B:
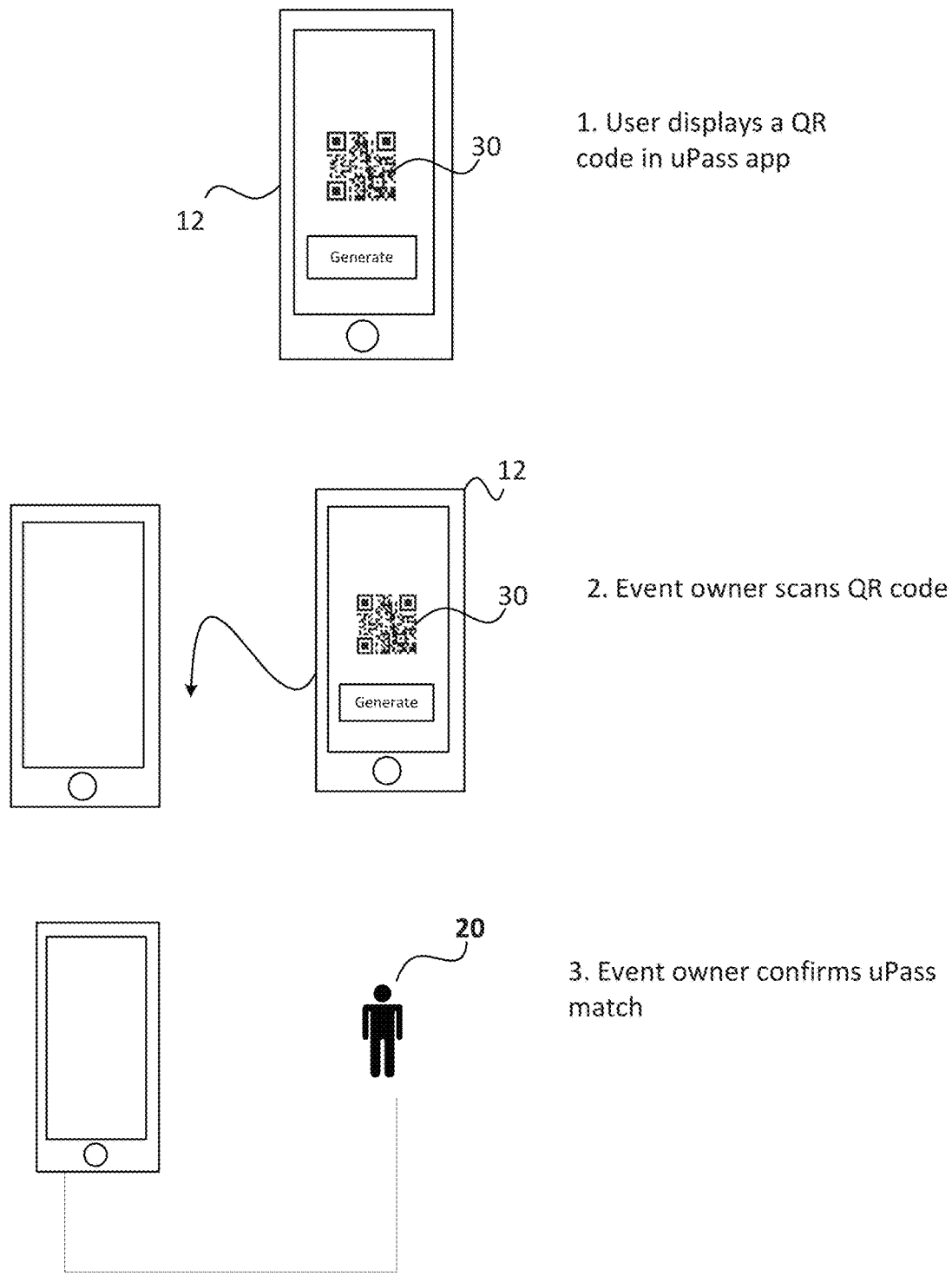
FIGS. 11B to 11H exemplify use cases of a digital profile.
Figure 11C:
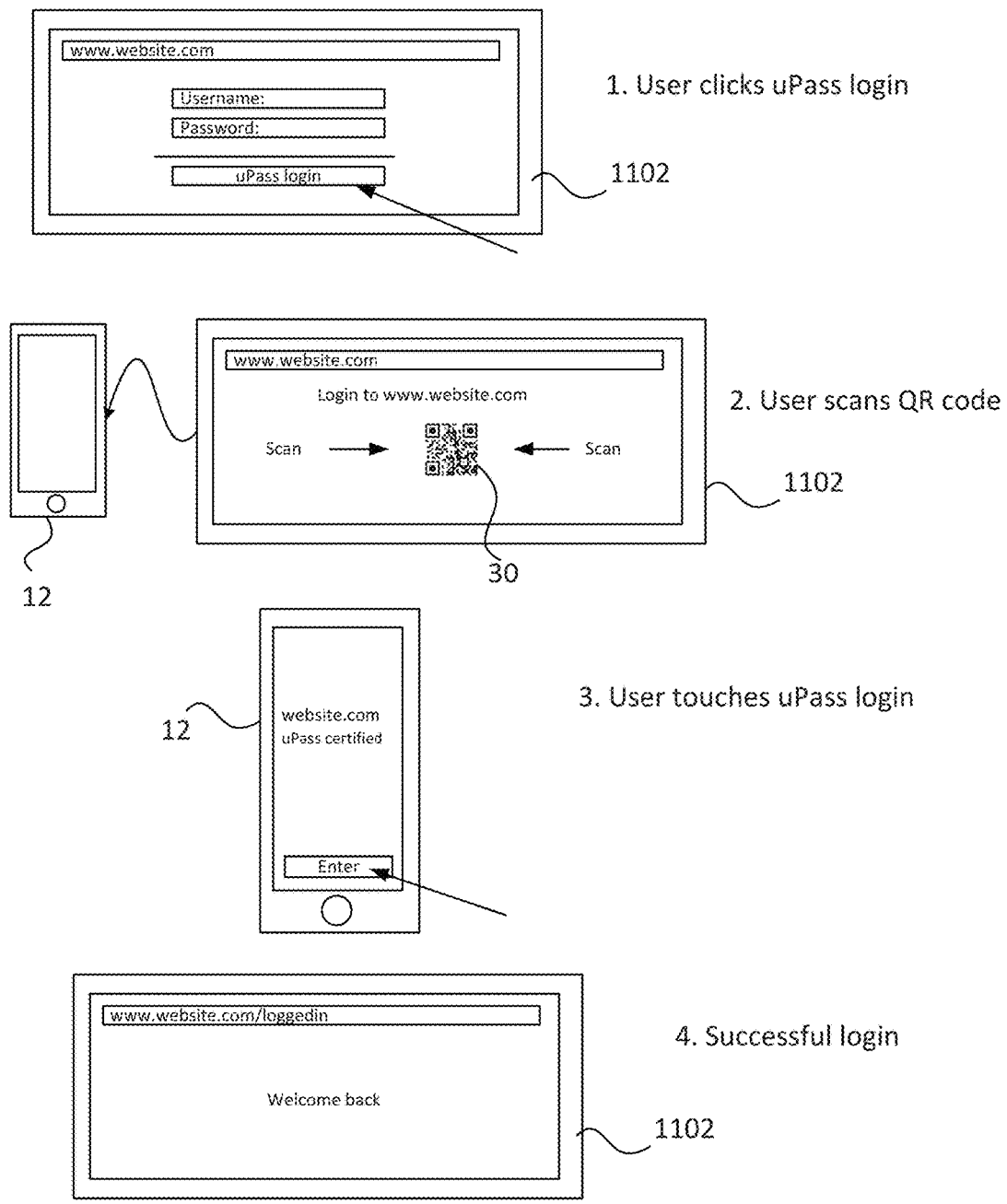
Figure 11D:
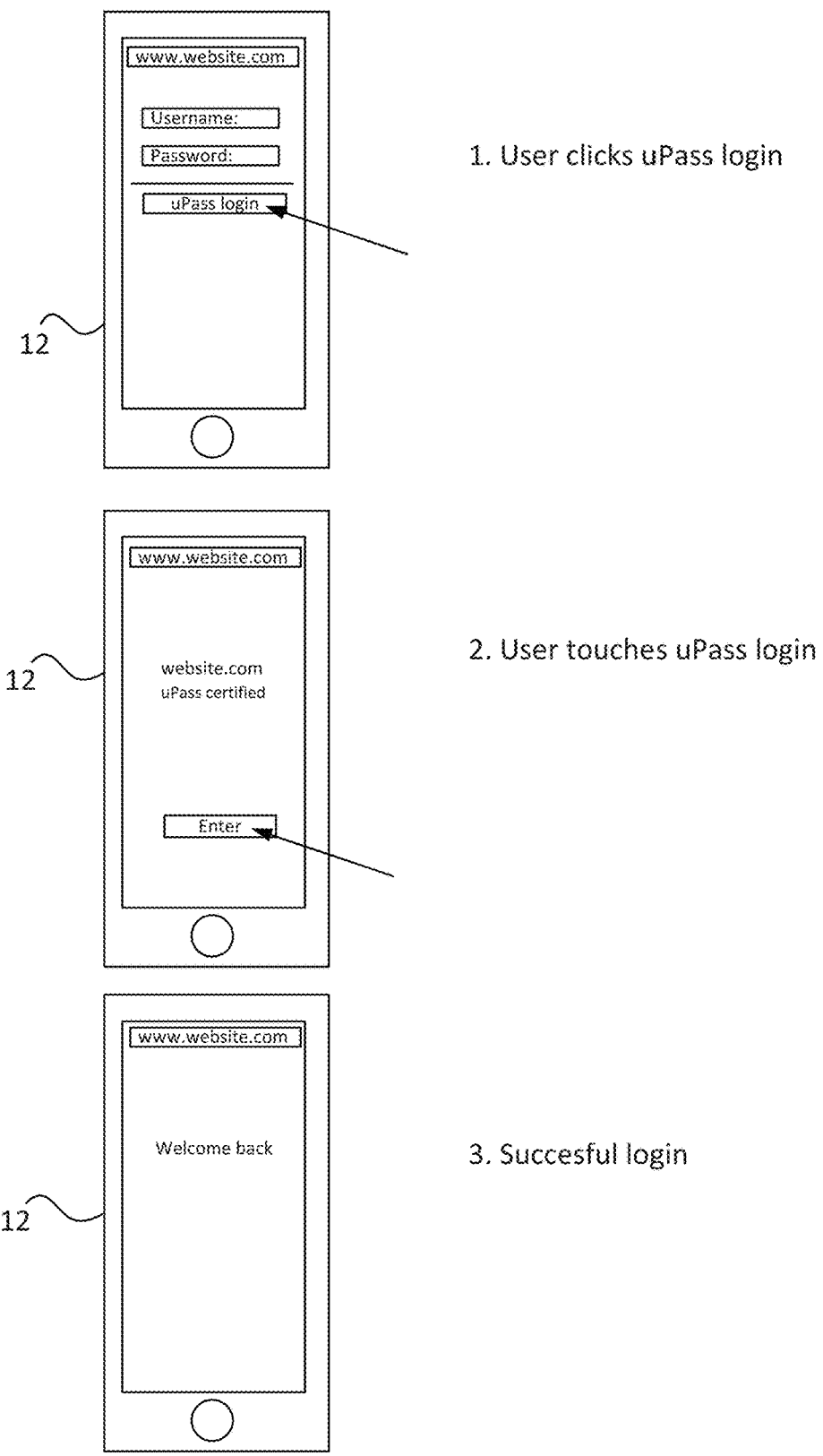

A graphical illustration exemplifying the registration process is shown in FIG. 11a

Confidence Anchors

An important facet of the uPass system is the self-validating nature between uPass holders. That is, uPass holders may assert their confidence in each other's identity. Each uPass can act as a confidence anchor 110 for the individual profiles of other uPass users.

Internally any data item added to a profile gains a contingent trust which is a function of both the number and quality of validations performed by other uPass users to establish it.

Once entered into a profile these data items can be used in other profiles as well, but where they are, the contingent trust associated with these profiles becomes that of the least trusted data item in the profile. This way there is always a degeneration from the contingent trust represented by source registration documents which can only be offset by a statistically significant number of validations by other uPass users under profiles with a high level of contingent trust.

Third-Party Profiles

Registration documents provide one means by which identity can be asserted with a high level of confidence. However, there are use cases where the identity which an individual might need to present does not derive from such a source but rather from their employment or membership in a particular organisation.

To allow for this an uPass can have profiles assigned to it by third parties and the contingent trust of these profiles is that mandated by the authoring party. None of the data items associated with an assigned profile is added to the set of data items available for use in creating additional profiles or modifying existing profiles, and the assigned profile can only be modified by the authoring party. To assign a profile, a third party must be an uPass user with a valid credential. He presents this credential and provided it is valid, receives a form to enter data about the new uPass profile. This is registered as before and a credential is generated and returned This can be passed to the owner of the new profile.

An assigned profile continues to exist until the authoring party cancels it, or until it passes a pre-assigned expiration date.

Social Graph Privacy

The uPass system contains a number of social graphs which effectively pinpoint an individual in relation to employment, friends, official documentation, transactional relationships and location. Full access to these graphs is private to the uPass system.

A primary exception is when an uPass user performs a validation based upon an assigned profile. In this case details are provided for the authoring party of the profile as an additional safeguard to the transacting party.

One application of the uPass system is to broker trust between two users of the uPass system, one an individual seeking to assert their identity and the other interested in using that assertion to validate eligibility for some service or interaction. This can be seen as a single transaction comprising authentication of the parties' identities.

This trust transaction requires two separate application modes, one on a user's mobile device for asserting their identity (app 50), the other on a merchant's device (app 52) for verifying assertion and then determining if the user is authorised to undertake a particular action.

To assert identity requires the presentation of an on-device credential 30 either in a visual form such as a QR code or barcode, or as a transmittable binary blob for use with NFC or similar technology. The uPass authentication app presents an appropriate credential 30 to an uPass reader 54 in app 52 which then despatches this to the authorisation service 14b for authentication. If this authentication operation is successful, the uPass reader app 52 will receive access to one or more uPass profiles and the user can then confirm his identity based on data items in the profile he can now view, such as a photo.

When a fresh credential is generated, it is bound [to an individual profile associated with the uPass user (see database in FIG. 3b). When the credential is used the information in this profile then becomes available to the validating party in the trust transaction.

For added security, the profile contains no linkage to the uPass user. This precaution ensures that gaining access to a specific profile does not provide a means whereby all of the profiles associated with the uPass user can be accessed. Only the information provided in the profile associated with the credential used is exposed to the other party, along with any information which they have published on the validated uPass in the form of a series of assigned profiles.

As an added safeguard issued credentials can be bound to the device's network address 64, so if the device changes network address the credential is also invalidated.

At no point is the asserting party's digital identity identifier 26 exposed. This is essential to the integrity of the system, even for casual use cases. Likewise, no personal information regarding the asserting party is revealed beyond that necessary to broker trust.

Summary of Credential Creation Process

This process is carried out by the identity management code executed by processor 114 (or by any suitable computer mechanism) at registration of a new profile, and at each occasion the profile is used.
1. determine the device identification number of a new device when it is registered;
2. calculate the SHA-2 HMAC of this device identification number;
3. store this device identification number securely;
4. for each credential generated:
   1. create a random salt value (preferably at least 8 bytes in length)
   2. combine this with the stored device identification number to create a unique credential number;
   3. perform SHA-2 hashing iteratively with the stored credential number as the seed value;
   4. the number of iterations is chosen randomly within specified bounds;
   5. the resulting token is the credential passed to the device.
5. a database entry is created keyed to the generated credential 30 which contains (see FIG. 3b);
   1. a random reference key 60 specific to this credential;
   2. a URI 62 capable of providing the profile to which the credential is bound;
   3. the network address 64 of the device for which the credential is valid;
   4. a link 66 to the uPass user for which this credential was generated;
   5. the expiration time 68 of the credential;
   6. other metadata 70 related to the credential lifecycle Credentials are "single use" and "restricted".

Single Use Credentials

A feature of the uPass system is to allow a user to present a smartphone/tablet, etc. to validate their identity. One possibility is to use as an on-device credential its device identification number. However, this has the drawback that once assigned it cannot easily be changed and also reveals information about the device which could be used by an attacker. An improved alternative is to use a key which is generated based upon the serial number using a hashing algorithm such as SHA-2 iteratively. This involves creating a hash for the serial number and then creating a sequence of salted hashes with this value as the starting point.

Only the HMAC of the initial hash value is ever stored, enabling the identity of a device to be described without knowing its precise device identification number and thereby preventing anyone with physical access to the secure store 24 from reversing the process to determine the device identification number and use this information maliciously.

To capture credentials from a device an uPass application either scans a generated QR code containing the credential or receives the credentials via some other means, such as NFC, iBureau, barcode, etc.

Restricted Credentials

Each generated credential is specific to both a device and an uPass profile. This prevents credentials being transferred between devices and means that any given device is only able to present one profile at a time.

Credentials are generated by creating a random salt value and combining this with the device identification number. The result is then used as the initial seed value for an iteratively generated SHA-2 hash value with the number of rounds of iteration being determined at random.

Transaction Receipts

Whenever a validation transaction occurs two receipts 32e are generated, one sent to the validating party (i.e. the merchant—VALIDATOR) and one to the validated party (e.g. the uPass user—BEARER). A receipt contains four pieces of information:
1. the random reference key 60 associated with the specific credential used;
2. the profile URI 62 to which the credential presented by the other party was linked;
3. the URI of a list of all profiles currently assigned by the recipient to the other party.
4. the timestamp The random reference key 60 acts as a transaction identifier which is associated with a specific pair of receipts and thus a specific pair of credentials.

When a receipt is generated the relevant profile is encrypted with the symmetric key and published to a Published Profiles Store 35 at a randomly generated URI. Both receipts generated for a transaction thus use the symmetric key to encrypt their associated profiles.

These transaction receipts provide the basis for applications to interact with an uPass as will be explained subsequently in the discussion of uPass profiles.

Each device contains a receipt book 300 (FIG. 1a) which holds an arbitrary number of receipts from prior transactions. When a user wishes to prove that a transaction has occurred they can present the receipt as a QR code, etc. which contains only the random reference key 60 for the credential used. This can then be reconciled by a merchant or other uPass user with their own receipt book.

A copy of the receipt is maintained online in the master receipt book 31 which contains all receipts generated to date.

Authentication

A client device must be pre-registered and authenticate itself to perform an uPass validation for a given profile.

Standard Client Authentication

Each registered device contains a single one-use credential for each uPass user that it is registered to. Submitting the credential performs an implicit authentication, which is deemed to fail if the credential is unknown, expired or invalidated. There is also a small probability that a valid credential will be invalidated (as a randomised additional security check) on receipt to force an authentication failure for security purposes.

An enhanced authentication can be conducted when the standard authentication interaction fails, or where the use case requires it.

Enhanced Client Authentication

Some transactions require a higher level of confidence than the norm. For these a full-face photo is captured and facial recognition is used to identify potentially questionable transactions. Because facial recognition is never 100% accurate standard authentication based on facial recognition failure is not prevented if credentials are otherwise valid but enhanced authentication requests are prevented.

The enhanced client authentication mode also exists to secure administrative operations and to allow an uPass user to re-authenticate after an authentication failure.

The enhanced client authentication captures a photograph of the device user which is compared to the facial recognition database for the uPass user to whom the device is registered, and if the recognition fails then a security event is triggered and logged.

Credential Lifecycle

Credentials have a lifecycle which involves: their creation which binds them to an uPass profile; their distribution to a specific device; and their revocation or expiration. This lifecycle is managed solely within the validation service.

When a credential is created it is recorded in the secure store and tagged with the following metadata 70 to be used as part of managing its lifecycle:
- the uPass profile for which it is valid
- the time at which the credential was requested
- the time at which the credential was issued;
- the geo- and network-locations of the requesting device at time of issue;
- the expiration time (if any);
- the device details for the validation causing the credential to be issued;
- whether or not the credential has been revoked.

When the credential is subsequently received all of this tagging data can be checked to confirm if the credential is being used correctly. The record is then used to create auditing and security action records elsewhere in the secure store and then invalidated.

A credential may be revoked at any time. When revocation occurs the credential's record is flagged as revoked in the secure store but the record is not processed at that time. This allows the uPass system to monitor the use of revoked credentials and use the resulting metadata to assist in fraud analysis and prevention.

Once a credential is revoked or invalidated it cannot be reinstated as valid.

Garbage collection of expired and revoked credentials may occur in one of two ways:
- when a validation query occurs for the credential;
- via a background garbage collection task which reaps expired credentials.

Handling Invalidated Credentials

When a credential has expired or been revoked its use may indicate that the device to which it has been bound has been stolen or otherwise compromised. This represents a serious fraud risk.

In these circumstances we cannot issue a new credential to the device until it has been confirmed that it is still in the possession of the uPass user for whom the invalidated credential was originally created.

To confirm this we treat the device as if it is a new device being enrolled for the first time, a use case covered in the section on Enrolment.

Validator Authentication

The uPass validator device is built on the same principles as a standard uPass device. To perform a validation the validator device must present a valid credential for its associated uPass device. This ensures that only users of the uPass system can run queries against the uPass trust network.

The validator credential is sent as part of the request.

Bearer Authentication: Asserting an Identity

By limiting authentication to a single authorisation query rather than an ongoing transactional relationship uPass can be used to create a simple proof of identity system. More complex use cases based on event ticketing such as guest lists or digital festival passes can be built on top of this by allowing the merchant to assign a profile to an uPass user with an appropriate expiration date.

Figure 6:
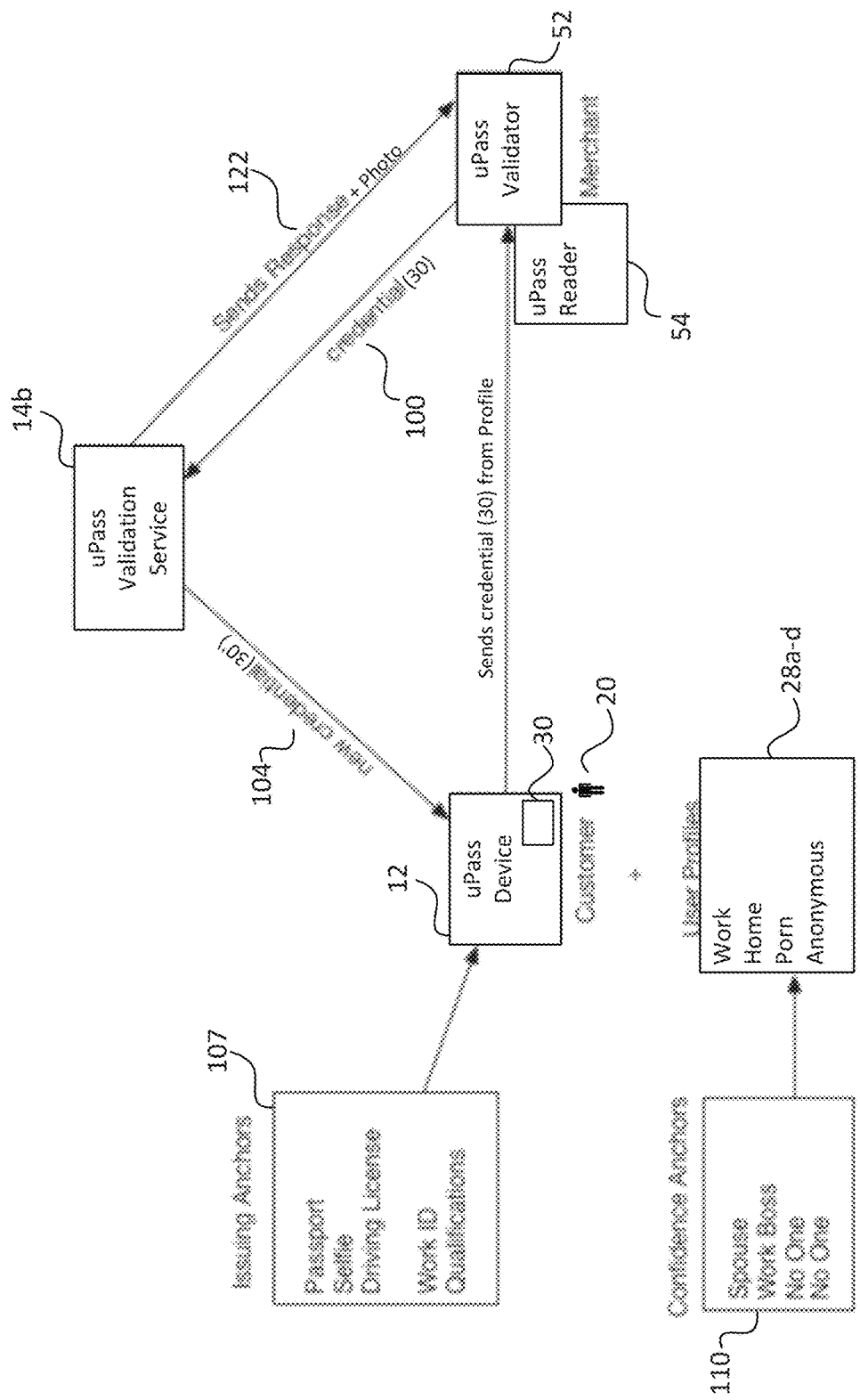
FIG. 6 is a schematic flow diagram showing an authentication process.

FIG. 6 illustrates a bearer only authentication process.

When a bearer-only authentication occurs the uPass reader 54 will send the credentials 30 proffered by the customer 20 in a message 100 to the authorisation service 14b. The user's credentials are then tested for validity before being marked as used and a response 122 is returned to the uPass reader along with a link to a profile which holds a photograph to allow visual confirmation of identity by the merchant.

FIG. 6 illustrates schematically a validation in its full context where the credential 30 on a device is backed both by a series of issuing anchors 107 which indicate the quality of registration documents 10 and confidence anchors 110 which indicate the extent to which the profile has been vouched for by other uPass users.

Because a credential 30 is single-use and potentially restricted it is possible that when proffered it will no longer be valid. When this is the case a fresh credential 30" may be automatically generated by the service 14b and pushed (104) to the bearer's device and from there to the validator, or the uPass user may be required to re-enrol the device.

The bearer authentication process is as follows.
1. uPass reader 54 requests credentials for authentication;
2. (optional if the uPass user has multiple profiles) the uPass user selects a profile be validated (note that validation will cause a new credential to be bound to the profile and their uPass device);
3. uPass user presents credentials to uPass reader:
4. credentials are bound to an uPass profile.
5. the credentials is despatched to the authorisation service 14b;
6. if a credential has expired, then the authorisation service:
   1. in the case that the uPass user has presented a valid identity:
      1. despatches a fresh credential 104 to the uPass user's registered device;
      2. sends a retry message to the uPass reader.
   2. otherwise:
      1. send an authorisation failure message to the uPass reader.
7. if the credential is valid:
   1. the uPass user's credential is invalidated;
   2. send message 122 to uPass reader comprising a link to a profile with a photograph (or the photo itself?)
8. in all other circumstances the authorisation service sends an authorisation failure message.
9. new credentials are generated and transmitted respectively to each uPass device 12.

This whole process must be repeated to perform additional authorisations, each time authenticating the uPass user's credentials against a specified profile and leading to a cascade of credential publication.

Figure 6A:
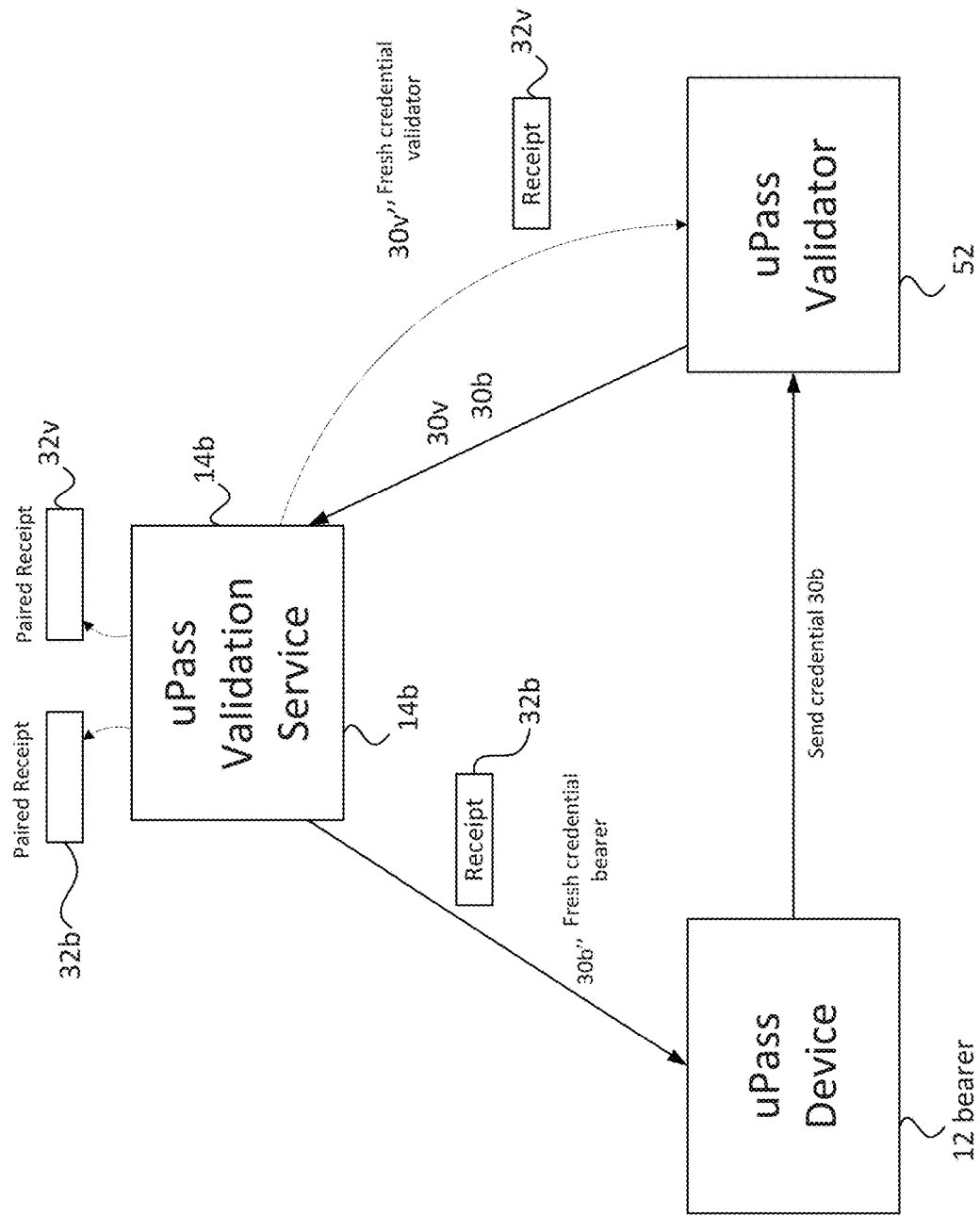
FIG. 6a shows an example of a validation process.

FIG. 6a shows a validation process in which both the credential of the bearer and the credential of the validator are validated, and in which receipts are issued. This a more complete description of the bearer authentication process described above with reference to FIG. 6. The uPass device 12 of the bearer sends its credential 30b to the uPass validator 52. The uPass validator supplies the bearer credential 30b and its own credential 30v to the uPass validation service. The uPass validation confirms that the credential 30v is valid, and if so goes on to process the credential 30b. If the credential 30b is valid, it returns (message 112 in FIG. 6) a link to the profile bound to the credential 30b to the validator 52. It also issues a new (fresh) bearer credential 30b" to the bearer device 12 and a new validator credential 30v" to the validator 52. Each fresh credential is returned with a receipt which is denoted 32v for the validator and 32b for the bearer. The generation of the fresh credential in each case is associated with the issuance of a pair of non-matching (individual) receipts. In each pair, one receipt is sent to the bearer and comprises a link to a newly-published published profile of the validator and the fresh bearer credential for later use by the bearer, and the other receipt of the pair is returned to the validator and comprises a link to a newly-published profile of the bearer and the fresh validator credential. Thus, in the embodiment of FIG. 6a, a pair of receipts is issued for the creation of the fresh credential for the validator, and a pair of receipts is issued for the fresh credential for the bearer. The two receipts 32e, 32v comprise matching transaction identifiers identifying the transaction in which they were created and tying them together. A corresponding master receipt 32 comprises the same transaction identifier (which links it to the corresponding receipt pair) and both links but not the credentials.

The receipt 32v can include the link to the photograph for the bearer in the relevant profile.

At any time between transactions a user can choose to acquire credentials for a different profile. However, they can only ever have one credential on their device for a given uPass user.

Mutual Authentication Peer-To-Peer Trust

One useful feature of the uPass system lies in its ability to establish mutual trust between two parties, allowing a broader range of interactions than those permitted by the bearer authentication mode. In this case each party presents credentials to the other for authentication by the authorisation service and an ongoing transaction is established.

The advantage of a transactional model is that transactions cannot overlap, therefore any device can only be engaged in a single transaction at any one time. If a device attempts to start a new transaction the previous transaction can be automatically terminated.

When a mutual authentication occurs each party captures a credential from the other party and despatches this to the authorisation service for authentication. If both sets of credentials authenticate then a transaction is established and each party is issued a unique symmetric key which is used to encrypt their ongoing communication with the server. These keys are time-limited (for example, a limit of approximately 5 minutes) and if the transaction is ongoing will be replaced when they expire.

A transaction can remain active for an indefinite period of time, but to do so both parties must send a keep-alive message to the authentication service when their keys expire. If either party fails to provide the keep-alive message then the transaction is terminated.

As an added security measure each transaction can be tied to the specific devices used to initiate it, and to a specific profile for each party.

Once a transaction is initiated either party can test authorisation propositions against the active profile of the other party for the duration of the transaction.

Anonymous Authentication

The uPass system ties authentication to a specific profile (28a . . . 28d) but leaves the uPass user in control of how much information they reveal to the other uPass users via their profile selection. It is therefore practical for two uPass users to broker trust for a given purpose without revealing any personal details to each other—only to confirm their physical appearance. To facilitate this every uPass user has an associated anonymous profile 28a.

Profile Avatars

A second possibility for credentials is the use of a characteristic avatar (an image, movie clip or audio file), which is issued by the uPass system with a credential embedded in the data. Profile avatars with company logos can be used to embed a credential. The avatar image can then be submitted to a website or via NFC to a mobile device with the recipient authenticating it against the uPass system and receiving back the source data which can be used to confirm the identity of the user.

The avatar acts as a container for credentials which aside from the need for embedding and extraction are handled in exactly the same way as any other uPass credentials.

Each avatar is bound to an uPass profile. In some circumstances there may be a limit on the number of avatars allowed per profile, as yet to be determined.

Web-Based Authentication

In the above description, it is assumed that uPass credentials are stored and read by mobile devices using proprietary applications. Another use case which needs to be addressed is that of conventional web applications running inside desktop browsers.

Figure 7:
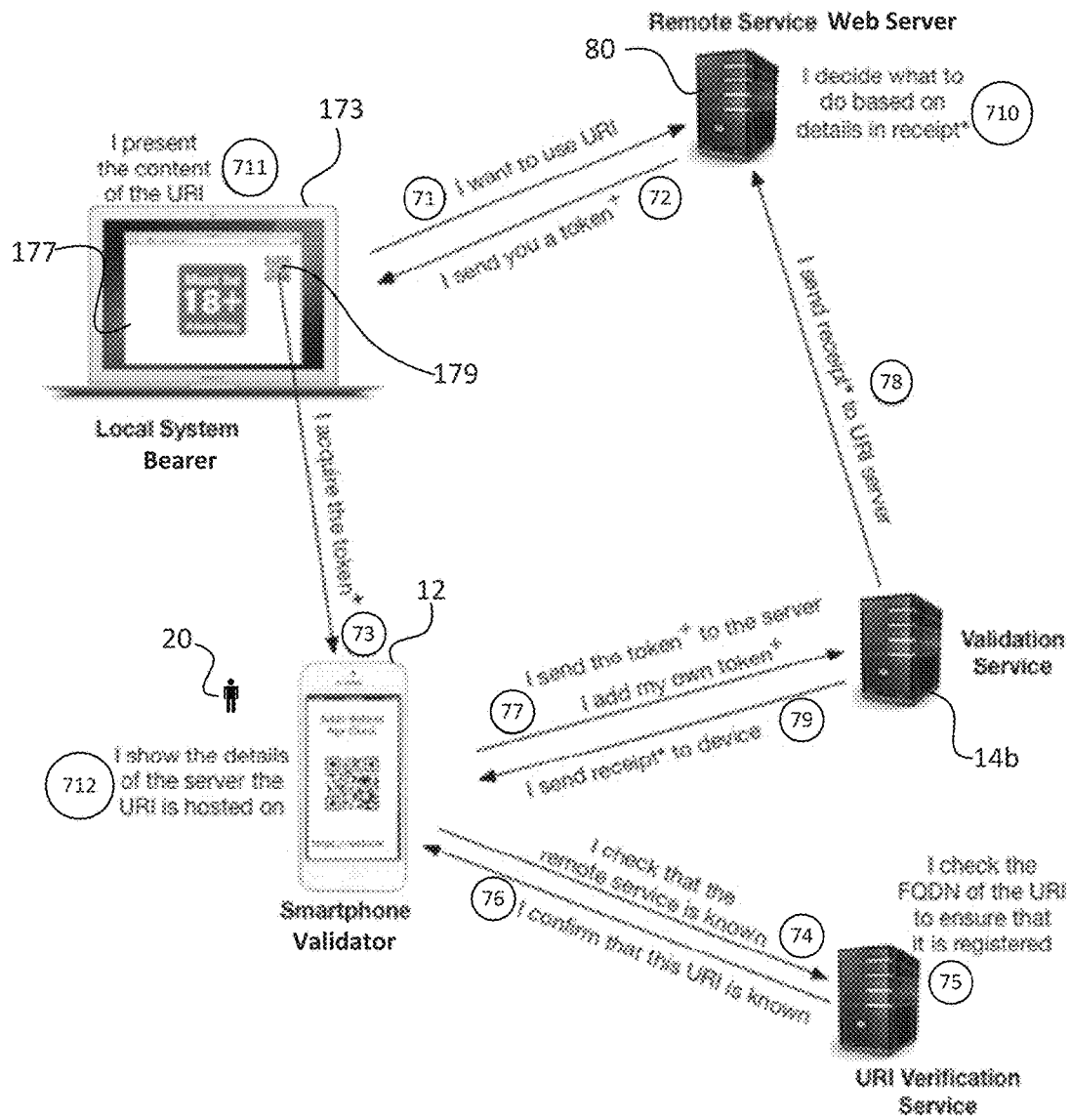
FIG. 7 is a schematic flow diagram showing an authentication process for a web service.

This is referred to herein as uPass Connect and is illustrated in FIG. 7.

uPass Connect uPass Connect provides a protocol whereby the user of a network system wishing to login to that system can do so using their uPass credentials on a trusted device such as a phone or tablet. One use case is for websites and applications, however uPass Connect should be usable with any client/server system capable of presenting a unique token to the uPass user.

In this situation there are two trust queries being performed:

the uPass user 20 is seeking to confirm the identity of the system (web server 80) to which they are providing a credential;

the system (web server 80) is seeking to confirm the identity of the uPass user 20.

There are actually three actors involved in this transaction as the local device 173 (e.g. a PC) being used to login to the system needs to acquire the trust which is being mediated between the uPass device 73 and the remote system 80.

Server Enrolment uPass Connect brokers trust between a server 80 and a client device 12. The client device 12 is already enrolled for the prospective user 20 and has a credential 30 bound to a profile. However, for the server to interact with the uPass system it needs to be enrolled as a device. This process binds (in the database of FIG. 3b) an uPass profile 28 for the server operator to a credential 30 to allow interaction.

Once enrolled the server is able to create virtual devices which can then be used to manage login and registration initiated by prospective users of the server.

Virtual Devices

The uPass validation transaction requires that each uPass credential is uniquely bound to both a profile and an enrolled device. Whenever a network system establishes a session by presenting a login or registration form 177 to a visiting uPass user via a client application, it needs to uniquely identify this session to the uPass system. Which introduces the need for a transient virtual device. A transient virtual device is created as part of the session establishment procedure, triggered by step 71 "I want to use URI". This device is enrolled using a standard uPass validation and assigned a unique device identifier. This device identifier needs to be unique for the uPass user providing the uPass Connect session. The same device identifier can be reused across different uPass users.

Once the virtual device has been enrolled, a credential 30 is issued to it, which is transmitted (step 72) in a webpage and forms the basis for a QR code 179. Which will be displayed in the updated webpage 177 issued after enrolment of the virtual device. The native app on the smartphone 12 can scan in this QR code and transmit it to the uPass validation server 14.

Inversion of Trust

In the standard uPass validation scenario described in the preceding sections, a validator requests that a client (bearer) wishing to engage with them to provide an uPass credential which can then be checked against the uPass validation server. The uPass Connect system does not take this approach as there is no guarantee that the client application will be running on a device capable of soliciting a credential from the uPass user seeking to use the network service.

To get around this, the uPass validator presents the credential in visual form (such as the QR code 179) via the client application and the uPass user 20 seeking access scans this (step 73) into their own uPass-enrolled device 12. As an alternative to the QR code, the scan could be by NFC, Bluetooth, Wi-Fi, audio, or any other data transmission mechanism. This flexibility allows uPass Connect to support Internet of Things embedded use cases.

In step 74, a check is performed to a URI verificastion service to check that the FQDN of the URI is registered (step 75), a confirmation is returned to the smartphone (step 76).

This scenario can play out in one of two ways. In the most common case the uPass bearer 20 is using their mobile device 12 to gain access to a web site via a browser session running on a desktop or laptop device 173 scanning the QR code displayed in the client application.

There is however a second possibility in which the uPass user wishes to connect to the website from a browser or application on the device hosting their uPass credential. Where this is the case the QR code will be transferred from the browser application to the uPass application and thence transmitted to the validation service.

Once acquired, this credential (which is annotated with the URI indicating the system to which the client application is attempting to connect) is passed (step 77) to the uPass validation service, which then determines if the URI is valid and known, by looking up the credential in the database of FIG. 3b. To simultaneously validate the user of the device 20, his credential is added to the message in step 77. Assuming the credentials are validated, a receipt is sent to the URI server 80 (step 78) which determines what to do (step 710) based on the validated identity presented in this receipt. A receipt is also sent (step 79) to the device 12 with details of the server hosting the URI, for display (step 712) to the user 20.

Requiring a Specific Profile

A server supporting uPass Connect may wish to only ever receive profiles it has assigned. This can be reflected in the credentials used by its virtual devices.

Registration Completion

When an uPass user wishes to register with a service supporting uPass Connect they have the option of performing an uPass validation. This provides the server with their current profile (providing details information for a registration form) and a link back allowing a profile to be published against their uPass account.

Business Case: Online Age Verification

One of the key problems uPass Connect solves is the need to certain web-based industries to restrict access to their services in response to minimum-age legislation. This applies to sites operating in the online gambling, pornography, video and general retail sectors.

Site operators can require an uPass age-check profile to determine the legal eligibility of a visitor to access their content and take appropriate action based upon this. Performing this validation also creates an audit trail so that the site owners can subsequently demonstrate their compliance with the law.

Business Case: Virtual Cookies

When a site uses uPass Connect to control access to its content, it gains the ability to annotate users' uPass accounts with site-specific profiles which can be queried on subsequent visits. These can be used to store arbitrary information and therefore have a similar role to browser-based cookies, only without the inconvenience of storing them on a user's system.

Business Case: Restricted Site Membership

Many websites enforce a paywall around their content and maintain proprietary membership lists to control access through this which necessarily also require profile systems to allow user customisation. With uPass Connect both membership access and profiles can be managed via the standard uPass mechanisms.

Business Case: Embarrassing Services

There may be cases where the nature of the service being accessed is such that an uPass user would not want their photo shared with the service for quite legitimate reasons of personal embarrassment.

Referring to FIG. 2, the secure store 24 is a secured, privacy-preserving data store which contains user credentials and related metadata. It is an aim of the system design that an uPass operator should have the bare minimum access to the personal information associated with any given uPass user.

If this data store is ever compromised, so potentially are the identities of all the users. Therefore the secure store is placed on a separate internal network segment isolated from the outside world with multiple layers of hardware security to ensure this. The data link between the uPass service and the store is secured at a protocol level to further reduce the risk of internal threats.

Within the data store 24 are contained (see FIGS. 3a/3b):
the registered identity documents 10 for each individual;
details of their authorised mobile device 12a, 12b;
currently issued credentials 30;
all previously issued and now invalid credentials 30';
identity statements and their confidence anchors 110;
identity profiles 28a . . . 2b.
This content is stored in an encrypted form.

An encrypted database also needs a search facility and this is implemented in one embodiment by storing characteristic cryptographic hashes for each indexable data item.

These have the advantage of being irreversible making it impractical to use them as a means of recovering the source data in the event that the secure store is compromised, whilst at the same time having a very low probability of collision making them good index keys.

Whenever an incoming request for identity assertion is received the uPass system first checks to see if the device is authorised to make the request. If it is, then receipts will be generated for both parties which are stored in the Master Receipt Books using their provided public keys.

Facial Recognition Database

For each user, a separate facial recognition database is maintained trained on that user's photos.

Offline Usage

The standard uPass mechanism described above are predicated on the availability of network access for both uPass bearer and uPass validator.

Credentials

An uPass credential is one-use and requires validation by the uPass validation service. Therefore credentials cannot be used reliably for offline usage.

Receipts

Receipts are statically published identifiers which always correctly resolve to a published profile and to a consumed credential.

Many offline use cases can be modelled in terms of a locally deployed cache of transaction receipts. The local database of transaction receipts is effectively an offline identity cache with visual user validation supported by a photo for each receipt.

The transaction identifier in the receipt will never change so this can be presented as a printed QR code, barcode or binary blob in an NFC tag.

It is the responsibility of the uPass validator to ensure that relevant profile data is successfully acquired before their access windows expires, and that charged items are properly accounted for during the event.

Receipt-based usage can be reconciled later via an online mechanism to provide a concrete audit trail.

e-Wallet

Another possible application of uPass is a digital wallet which allows a sum of money to be associated with a particular device and used to purchase goods or services. This is essentially an extension of the qualification use case which adds a transactional exchange, requiring confirmation to the vendor that a payment has been successfully made along with the actual transfer of money between the two parties.

Confidence Values—Vouching

A transaction can be performed with the particular intent of increasing the confidence value assigned to a target entity's profile, in which a vouching entity vouches for the target entity. The vouching entity collects a credential from the target entity and presents it to the uPass system with their own credential in an electronic vouching message. The vouching entity's credential is bound to a profile of the vouching entity to which is allocated a relatively high confidence value (relative to the target's profile as bound to their credential). On the basis of that higher confidence value, the transaction causes the confidence value of the target entity's profile to be increased. Being a transaction, this uses up the vouching and target entity's one-time use credentials and fresh credentials, bound to the respective profiles, are issued accordingly.

When the target entity's profile is later made available to a validator through presentation of the target's fresh credential, the uPass system may in addition to revealing the (now higher) confidence value of the relevant profile, identify the vouching entity as the source of the high confidence value to the validator. For example, the validator may be a business, the vouching entity a well know customer of that business, and the target entity a new customer of that business. The profile may be a profile created specifically for the benefit of that business, whereby the initial low confidence value of the target's profile is indicative of the fact that the target is an unknown customer.

Use Cases—FIGS. 11B-H

In each of the use cases of FIGS. 11 B-H, a validator captures a credential from a bearer. In some cases the user is a bearer and the validator a device, in others vice versa. Sometimes both are humans. Each use case is based on a uPass transaction, in which the validator captures a bearer credential 30, and present's it to the uPass system with his/her/its own credential. Both credentials are one-time only use and bound to bearer and validator profiles respectively, which may be profiles specifically created for the type of transaction in question. Subject to both credentials being valid, a version of the validator (resp. bearer) profile is published and a link to the published version provided in a receipt sent to the bearer (resp. validator). This uses up the credentials so fresh validator and bearer credentials are also issued in the validator and bearer's receipts respectively.

A user 20 can verify their identity to an event owner (FIG. 11B) by showing a valid credential 30 bound to e.g. a profile specific to the event on the display as a QR code. In this scenario, the user is the bearer. The creation of the event profile may be conditional on the user having paid an appropriate admission fee or some other predetermined admission criteria. A validator (event owner) captures the credential and presents it to the uPass system. The system publishes the relevant profile so that it is accessible to the validator. The profile may simply be a photo of the user's face 20. The validator can compare the photo to the user and thereby verify that the user 20 does indeed have a profile for the event (because they match the photo) and admit them to the event.

A credential outputted by a web page (FIG. 11c) on a separate device 1102 can be captured by the mobile device 12 can be used to simultaneously verify the website to the user 20 of the device 12 and the user to the website. In this scenario, the user is the validator and a Web server is the bearer. The user wishes to log in on a separate device, and captures the website's credential 30 from the separate device using their mobile device 12. That is, the credential is received at the mobile device 12 from the Web server via the separate device 1102. The user presents their own credential and the captured credential to the uPass system. Subject to both being valid, the uPass system verifies the user to the Web server (by publishing the user's relevant profile to a location accessible to the Web server and sending a receipt with a link to that location), and the Web server to the user (by publishing the relevant profile of the Web server to a locational accessible to the user device 12 and sending a receipt with a link to that location). The web site can grant access to the user accordingly, and the user can proceed safe in the knowledge that the website is genuine. Both the Web server and the user have now used up their one time credentials for their respective profiles so fresh credentials are issued with the receipts. FIG. 12D shows a similar scenario, in which the website is instead accessed on the mobile device 12 directly. Here, the credential 30 (not shown in FIG. 12D) comes straight to the mobile device 12 from the Web server via the Internet or other network. The underlying mechanism is otherwise the same.

Figure 11E:
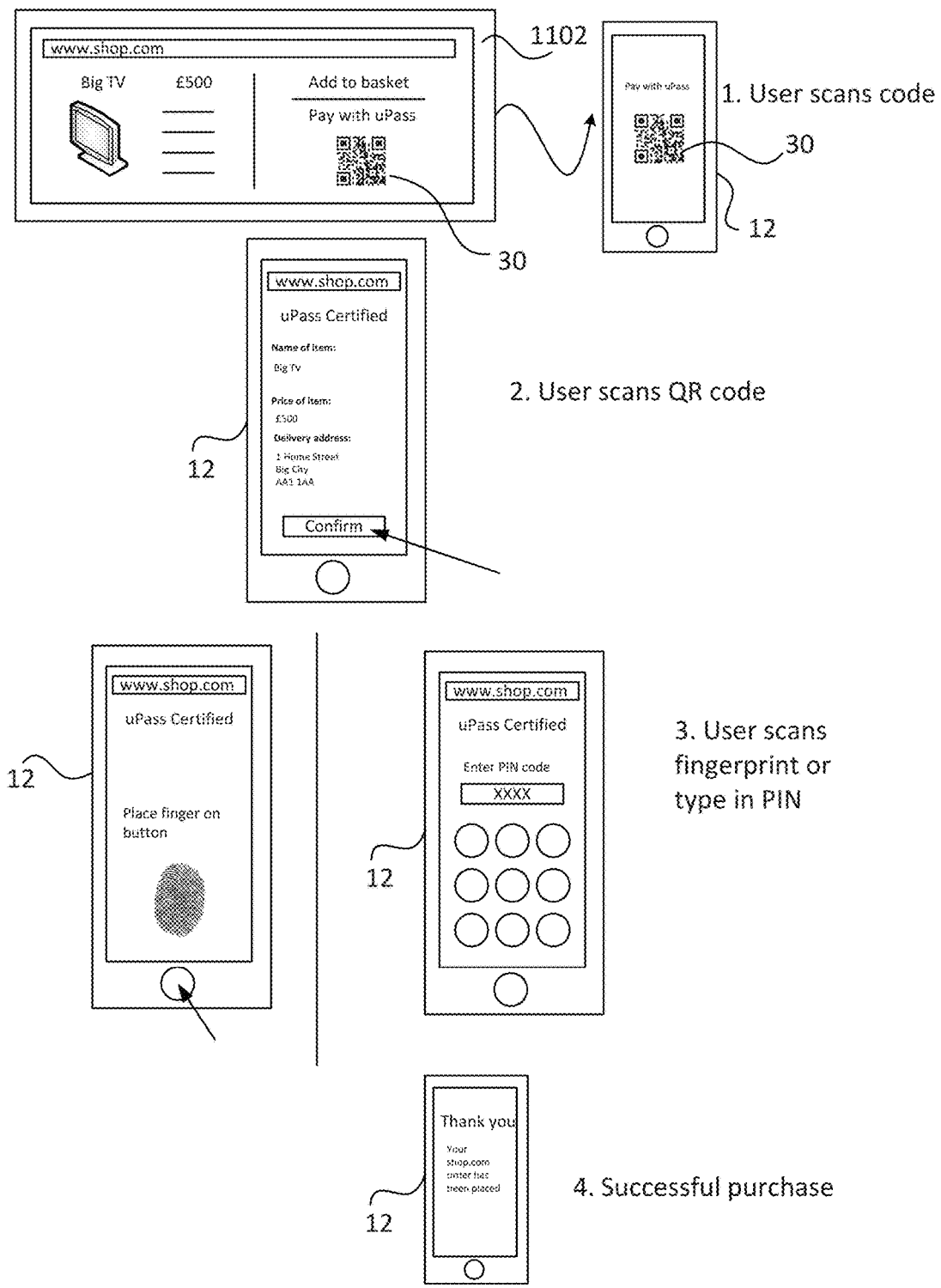
Figure 11F:
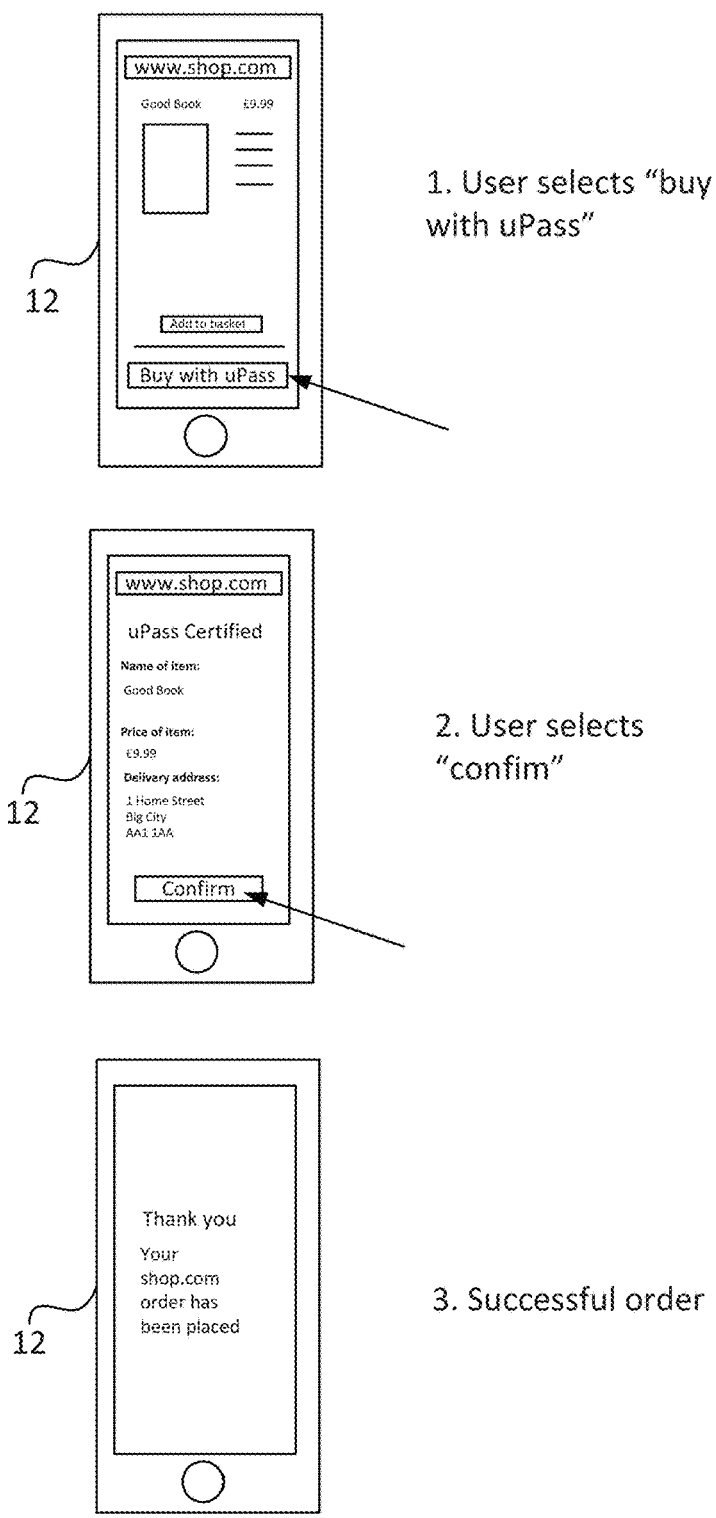
Figure 11G:
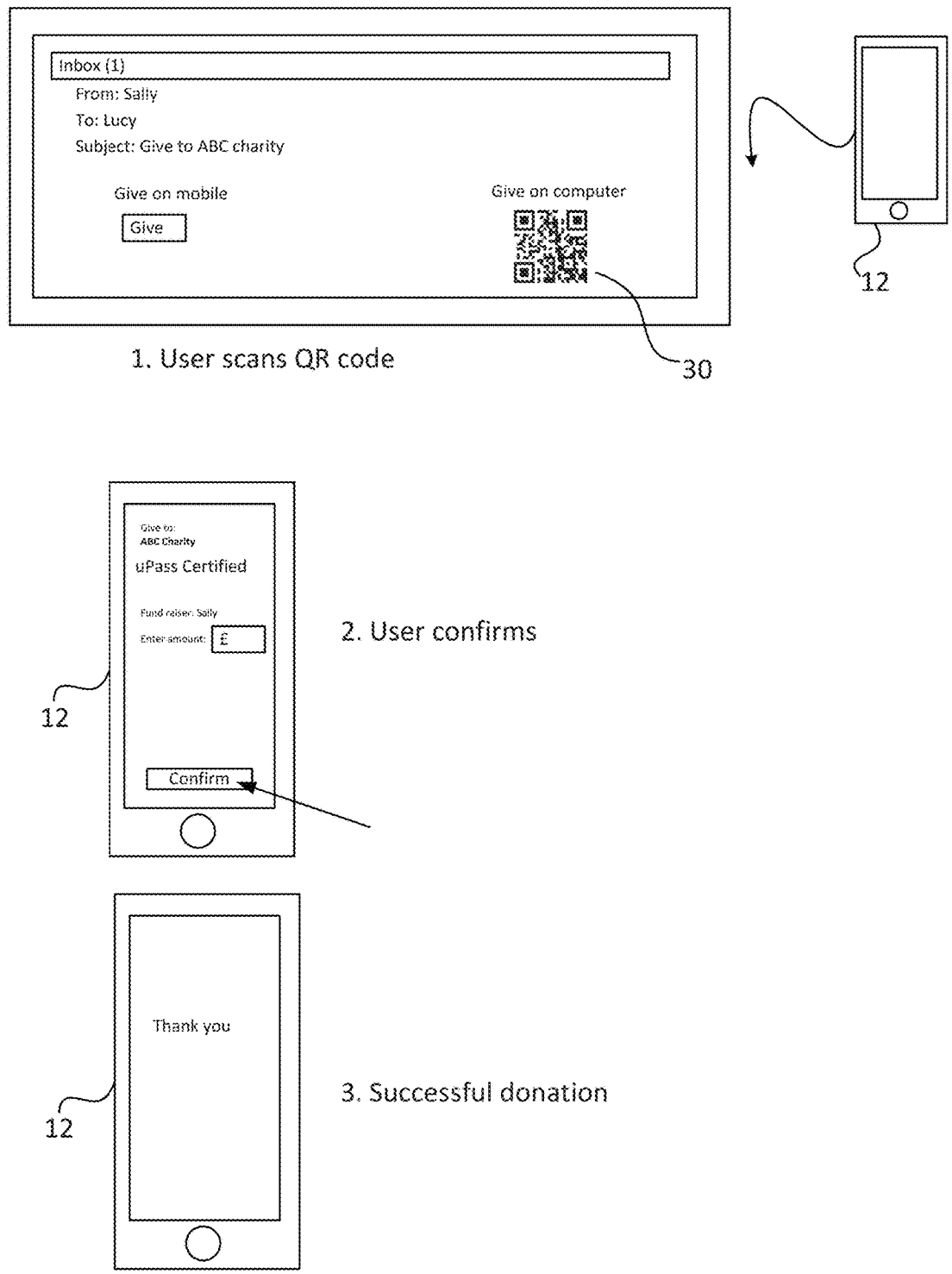
Figure 11H:
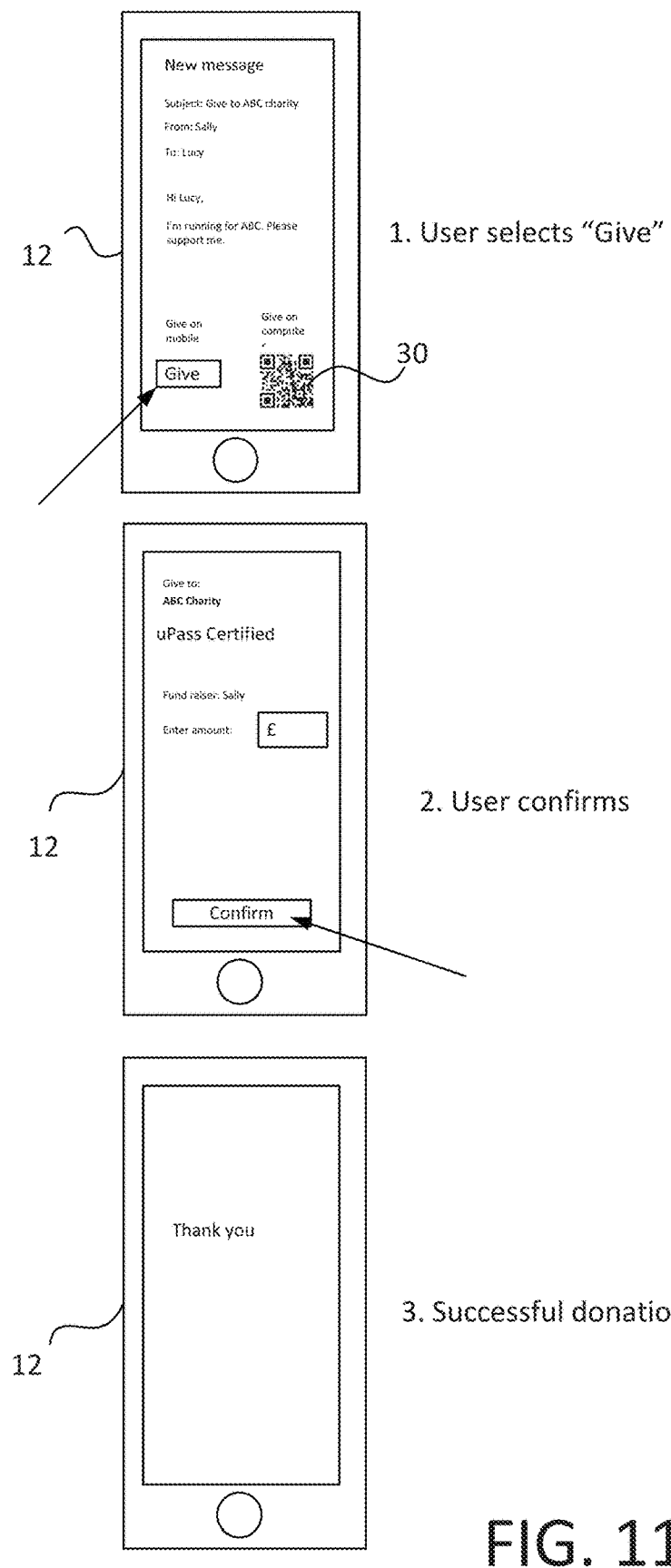

FIG. 11E shows how a user may effect a purchase form a website hosted on a Web server presented on a separate device with their mobile device 12. After capturing the website's credential, the user is required to provide additional verification by entering a PIN or scanning their fingerprint for example before the uPass app will present the captured credential and the user's own credential to the uPass system to provide additional security. Because the website has confidence the uPass system, it allows the transaction to proceed on the basis of the receipt which is issued to it. FIG. 11F shows an equivalent scenario in which the website is provided to the mobile device 12 directly, and without the additional layer of security. In both FIGS. 11E and 11F, a key aspect is the simultaneous verification of the web Server to the user (so the user knows they are safe to purchase goods or services form the website), and the user to the Web server (so the website knows it is safe to sell to the user). As will be apparent, an equivalent use case is a real-word use case in which Web server is substituted for a human vendor operating the separate device 1102. FIGS. 11G (separate device) and 11F (same device 12) shows how a user may use their uPAss to donate to charity. The underlying principles are the same as the purchase scenarios only here the reward reaped by the user is intangible.

Transactions—Examples

A credential bound to a profile can be used once in a uPass transaction to do e.g. one of the following:
1. simply publish that profile to make it accessible to a validator;
2. modify that profile e.g. by adding a data item(s) to it;
3. create a new profile;

the profile to which the credential is bound is also published in 2 and 3, as that is an inherent part of a uPass transaction. In 2 and 3, a requesting entity may be e.g. an employer and a target entity an employee (see above), or the requesting entity may be a part of the uPass system itself e.g. the validation service 14b or uPass controller 116—as an exception, the part of the uPass system may not have a profile or its own credential (though neither are excluded). Thus, in this case, only one profile may be published (the target's, sent to the part of the uPass system) and only one fresh credential may be generated (for and sent to the target).

Figure 12:
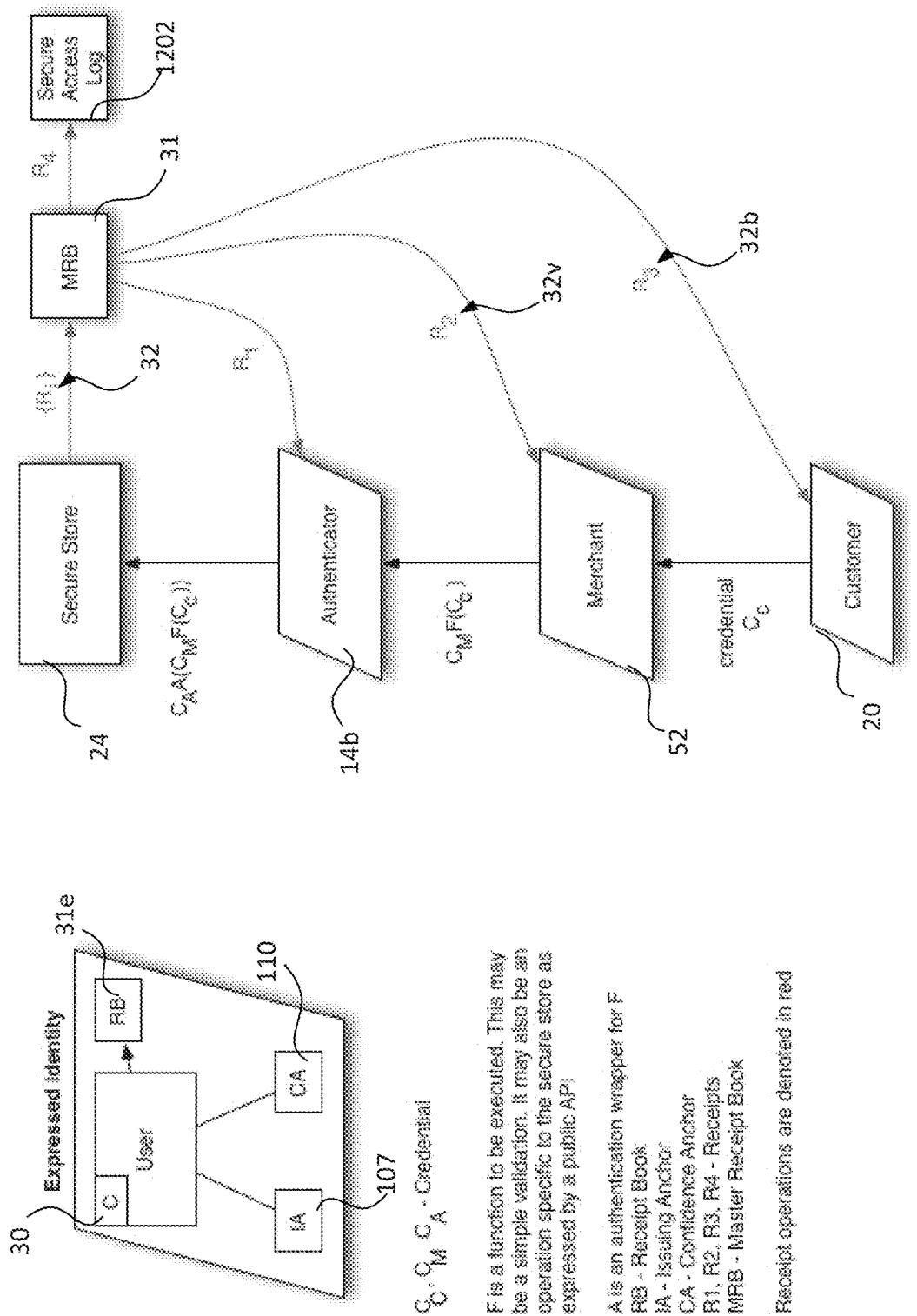

A uPass transaction can be conducted between three entities (such as bearer 20, validator 52, and validation service (authenticator) 14b), as shown in FIG. 12. In FIG. 12F represents a function to be executed. This may be a simple validation. It may also be an operation specific to the secure store 24 as expressed by a public API. A represents an authentication wrapper for F. The bearer 20 (e.g. customer) sends their credential Cc to the validator 52 (e.g. merchant) in a first electronic message. The validator sends its own credential Cm with the bearer credential Cc with an indicator of the function F to be executed to the authenticator 14b in a second electronic message ("CmF(Cc)"). The authenticator sends CmF(Cc) with an indicator of the authentication wrapper A and its own credential Ca to the secure store 24. A set of four receipts R1, R2, R3, R4 ({Ri}) is generated. A master receipt for the transaction is stored in the master receipt book 31, and bearer/validator receipts 32v/32b (R2/R3) are issued to the bearer and validator 20, 52. R1 is issued to the authenticator 14b, and R4 is logged in a secure access log 1202. All of the receipts R1, R2, R3,R4 and the master receipt share a transaction identifier which links them all together, FIG. 13 shows a similar scenario, however in this case the customer communicates directly with the authenticator 14b and receives both receipts R2, R3.

Glossary

| Term | Description | May associate with | Example |
|---|---|---|---|
| Account creation message | A message used in the account creation process | | |
| Acquired Credential | A candidate Credential acquired via mechanisms known to a specific Client Application. | | |
| An uPass | At least one (uPass) profile with at least one credential bound to it | | |
| Anchor | confidence or issuing | | |
| Authenticator | A service authorised to broker a Transaction between two Registered Devices. | | |
| Blob | a binary data element | | |
| Client Application | A software application running on a Registered Device and capable of storing a Current Credential. | | |
| Confidence Framework? | Confidence Network, Confidence Web | | |
| Confidence anchor | a uPass profile which is used to assert the validity of a upass profile belonging to a different uPass user | | Another uPass user |
| Confidence value | the numeric value assigned to an uPass profile based on the sum of the confidence and issuing anchors | | |
| Contingent Trust | A value indicating the trustworthyness of a particular profile or data titem based upon its confidence value and the usage of this profile or data item over time | | |

-continued

| Term | Description | May associate with | Example |
|---|---|---|---|
| Credential | A token binding a specific Profile to a Registered Device, both associated with an Identity. This token is unique and may only be used once. Optionally it may also be time-limited or invalidated. | a proflie, a registered device, a receipt | |
| Current Credential | The Credential which is valid for a specific Profile and Registered Device at a given point in time. | | |
| Data element | a combination of a data item and associated metadata | | |
| Data Item | Data Element | | |
| HMAC | In cryptography, a keyed-hash message authentication code (HMAC) is a specific construction for calculating a message authentication code (MAC) involving a cryptographic hash function in combination with a secret cryptographic key. As with any MAC, it may be used to simultaneously verify both the data integrity and the authentication of a message | | |
| HSTS | HTTP Strict Transport Security (HSTS) is a web security policy mechanism which is necessary to protect secure HTTPS websites against downgrade attacks, and which greatly simplifies protection against cookie hijacking. | | |
| Identifying Anchor | identifying document | | |
| Identity Assertion | Any atomic key value pair representing a statement about the identity of the uPass User | | |
| Identifying document | Issuing document | | |
| Identity | The characteristic information associated with a single user. An identity many consist of many profiles | | |
| Identity statement | profile | | |
| Issuing anchor | the author of an issuing document | | like the crown for a passport |
| Issuing document | a source document from which a profile may be created | profile | Passport, Driving Licence, Utility Bill, ID card, Student card |
| Master Receipt Book | A central repository of Receipts of all uPass Users. | | |
| Merchant | registered corporate entity, sole trader, partnership, registered charity, club, society etc. | | |
| Profile | A cohesive set of one or more Identity Assertions describing some aspect of an identity, combined with a photo and linked to the contingent trust system | | |
| Profile History | A time sequence of stored versions of a Profile for a given Identity along with associated metadata. | | |

| Term | Description | May associate with | Example |
|---|---|---|---|
| Published Profile | An instance of a Profile at a given point in time, stored encrypted in a randomly selected and publicly-accessible location. | | |
| Receipt | A token created subsequent to a Validation which contains key metadata related to that Transaction and links to a Published Profile for the other party involved in that Transaction. | | |
| Receipt Book | A time sequence of Receipts associated with a specific Identity | | |
| Receipt Pair | Receipts are generated in pairs so that each party to a Transaction receives one. The Receipt Pair are bound together by a shared Transaction ID which is used as a shared symmetric key to encrypt both associated Published Profiles. | | |
| Registered Device | Any computing system registered as valid for a given Identity | | |
| Registration data | Sum of all data items submitted for registration | | |
| Registration documents | submitted issuing documents | | |
| Registration item | registration Datum | | |
| Registration Event | The act of submitting or resubmitting an identity Document to the Secure Store, allowing its baseline Contingent Trust to be determined | | |
| Remote Connect | The mechanism whereby an intermediary unassociated with the system is used to present a Credential from a Virtual Device hosted in a remote service such as a web server. This Credential is then acquired by a registered Device which acts as a Validator. | | |
| Security Event | a message sent to a separate security auditing and enforcement system | | |
| Selfie | A self-taken photo of a user, in particular of their face | | |
| Social graph | mapping and pinpointing a uPass user in relation to other uPass users | | |
| System Application | One or more software applications which together use a series of Transactions to perform a more complex task. | | |
| Transaction ID | A cryptographically random, unique number used to identify a given Transaction. | | |
| Transaction Key | transaction ID | | |
| Trust Arbitration | An automated mechanism which establishes trust in a timely manner between two users via proffered credentials | | |
| uPass User | An entity registered to the uPass system that has been assigned at least one profile | | Some of the document type and the method of submission is contingent trust |

| Term | Description | May associate with | Example |
| --- | --- | --- | --- |
| Validation Transaction | The process of confirming that an acquired Credential is valid and current for a given Registered Device, leading to the creation and dissemination of a Receipt Pair. | | |
| Validator | A Registered Device capable of acquiring a Credential from another registered Device and using this to request a Validation via an Authenticator. | | |
| Virtual Device | A notional Registered Device which exists purely as an embodiment in software hosted on a physical Registered Device. | | |

Aspects of the Subject Matter and Embodiments Thereof

Various aspects of the present subject matter, and embodiments thereof, are set out below.

An aspect is directed to a method of authenticating content offered by a content source to a local device for displaying content, the method comprising: establishing a communication session between the content source and a browser executing at the local device; transmitting from the content source to the browser a validation page comprising a content authentication token which is a randomly generated one-time use only credential bound to the content source; capturing the content authentication token from the browser by a verification application; transmitting the authentication token to a validation service which determines whether the token is bound to a valid source of content; and causing the content to be displayed on the local device if the token is bound to a valid source of content In embodiments, causing content to be displayed may comprise transmitting a content source receipt from the validation service to a mobile device with or indicating a data item relating to the valid source of content. The content source receipt may comprise a link identifying a memory location from which the data item is accessible, thereby indicating the data item. The data item may be accessed from a digital profile of the content source identified by the credential. The profile may be published by storing a version of it to an addressable memory location, and a link identifying the addressable memory location is included in the content source receipt, thereby indicating the data item.

The verification application may be executed on the mobile device which captures the content authentication token displayed on the validation page by one of: digital image capture; scanning, near field communications and Bluetooth.

The content authentication token may be received by a local browser of the local device and transferred to the verification application which is executed in the local device.

Causing the content to be displayed may comprise transmitting a receipt to the local device which indicates a data item relating the valid source of content.

The token may identify an address of the source of content, the method may comprise transmitting the address to an address verification service to confirm the address is a valid address.

The data item may be displayed at the mobile device.

The data item may be details of a server hosting the content. The data item may comprise details of a virtual device hosting the content and/or a physical device on which the virtual device is running.

The method may comprise the steps of transmitting from the mobile device a device authentication token which is a randomly generated one-time use only credential bound to the mobile device to the verification service with the content authentication token.

The validation service may use the device authentication token to access a digital identity profile using the credential. The validation service may generate a device identification receipt comprising or indicating a data item accessed from the digital identity profile and transmits the receipt to the content source. The content source may determine whether or not to release content based on the data item in the device identification receipt. The method may comprise transmitting in the device identification receipt a fresh device authentication token.

The method may comprise a fresh content authentication token to the content source.

The device identification receipt and the content source receipt may share a common transaction identifier.

The method may comprise the steps of transmitting from the local device an authentication token which is a randomly generated one-time use only credential bound to the local device to the verification service with the content authentication token.

The source of content may comprise a server, and the token may be bound to the server. The content source may comprise a server, and the content authentication token may be bound to a transient virtual device created by the server in a session establishment procedure instigated by the local device.

A confidence value may be associated with the data item and displayed with the data item.

Another aspect is directed to a computer system comprising:
 a digital identity system configured to implement a validation service;
 a local device comprising a network interface and a processor configured to execute a browser which operates to:

establish a communication session between a content source and the browser via the network interface, and receive from the content source a validation page comprising a content authentication token which is a randomly generated one-time use only credential bound to the content source;

wherein a verification application captures the content authentication token from the browser and transmits the authentication token to a validation service which determines whether the token is bound to a valid source of content; and wherein the validation service causes the content to be displayed on the local device if the token is bound to a valid source of content.

In embodiments, the verification application may be executed on the local computing device. The computer system may comprise a mobile device, which comprises a processor and a network interface, wherein the verification application is executed on the processor of the mobile device.

Another aspect is directed to a digital identity system for creating a computer stored digital identity comprising:

a network interface configured to send and receive electronic messages;

persistent electronic storage;

a profile management module executing on a processor configured to receive from an entity an electronic message comprising a data item, extract the data item from the electronic message and store the data item in a digital profile in the persistent electronic storage;

a credential creation module executing on a processor configured to generate a credential for the profile and associate the credential with the digital profile;

a receipt generation module executing on a processor configured to automatically generate two non-matching receipts, each receipt comprising a transaction identifier, a first of the receipts comprising a link identifying the memory location to which the profile is published, a second of the receipts comprising the credential, wherein the first receipt is stored at the digital identity system and the second receipt is transmitted to an address associated with the entity; and a publication module executing on a processor configured to publish the profile by storing a version of it to an addressable memory location;

In embodiments, a master receipt comprising data of each receipt may also generated and stored in a master receipt book at the digital identity system, whereby both the first and the master receipt are stored at the digital identity system. The master receipt may comprise only part of the first receipt. For instance, the master receipt may comprise the link and the transaction identifier, but not the credential.

The credential may be a randomised one-time only use credential.

Multiple digital profiles associated with the entity may be created each profile being associated with a credential unique to that profile, wherein each digital profile may be published by assigning a unique set of data items for each digital profile to a corresponding addressable memory location.

The data item may be shared between the unique sets. For instance, one of the sets may consist only of the data item, and the remaining sets may each comprise the data item and at least one additional data item.

The data item may be a visual image of the entity.

The multiple data items may be received in the electronic message and stored in the profile.

Metadata available from a computer device associated with the entity may be received with the data item and stored at the digital identify system. The credential may be generated using the metadata. For instance, the credential may be generated by a hash of the metadata and a random salt. The random salt may be stored in association with the metadata, whereby a copy of the credential can be generated from the stored random salt and stored metadata. The credential may be generated by hashing the device metadata and the random salt a random number of times, wherein the random number may be stored in association with the random salt and the metadata. The metadata may comprise an identifier of the computer device (device identifier).

The credential may be associated with the digital profile by creating an entry in a database, the entry comprising the digital profile or an indicator which enables the digital profile to be located in the persistent electronic storage, wherein the publication module executing on a processor may be configured to use the credential as a key to that entry in the database to access the profile for publication.

The profile may be published in response to the credential being presented to the digital identity system. The credential is presented by a validating entity other than the entity, the credential having been provided to the validating entity by the entity.

The credential may be one-time only use, and the credential creation module executing on a processor may be configured to generate a fresh credential in response to the credential being presented to the digital identity system, whereby another version of the profile is published to a different addressable memory location by the publication module executing on a processor in response to the fresh credential being presented to the digital identity system.

A device identifier may be received with the data item and stored at the digital identify system, wherein publication of the profile may be conditional on a matching device identifier being presented with the credential.

The link may be generated from and/or the memory location may be selected based on a randomly generated sequence.

The link may be is a Uniform Resource Indicator (URI).

The digital identity system may comprise a confidence value management module executing on a processor configured to allocate a confidence value to the profile based on at least one of a source of the electronic message and a type of the data item. The confidence value may be published with the profile, whereby the confidence value and the profile are available to a requesting entity.

The confidence value may be changed over time based on a clock signal.

Another aspect is directed to a computer-implemented method for creating a computer stored digital identity comprising:

receiving from an entity an electronic message comprising a data item;

extracting the data item from the electronic message;

storing the data item in a digital profile in the persistent electronic storage;

generating a credential for the profile and associating the credential with the digital profile;

automatically generating two non-matching receipts, each receipt comprising a transaction identifier, a first of the receipts comprising a link identifying the memory location to which the profile is published, a second of the receipts comprising the credential;

storing the first receipt at the digital identity system; and transmitting the second receipt an address associated with the entity; and publishing the profile by storing a version of it to an addressable memory location.

Another aspect is directed to a method of registering a digital identity comprising:

capturing at a computer device a data item associated with an entity;

creating an electronic message comprising the data item;

transmitting the electronic message to a registration service;

receiving a receipt from the registration service;

extracting a credential from the receipt to render the credential available for accessing the data item for authenticating the entity; and storing the receipt in a local receipt book at a location accessible to the computer device.

In embodiments, the data item may be captured in the form of an identifying datum from an identity document.

The data item may be captured the form of a photo taken by a camera of the computer device.

The first data item may be captured by one of: scanning, near field access; and Bluetooth.

The local receipt book may be held at a server accessible to the device.

Another aspect is directed to a method implemented by executing digital identity software on a processor of a user device to:

capture with a camera of the user device an image of the face of a user of the device;

capture data from a real-world identity document, the data including an identification photograph, wherein the data is captured with the camera, from an electronic transmitter embedded in the anchoring document, or a combination of both;

transmit the image of the user and the captured data to a digital identify system; and receive from the digital identify system a credential for the user, wherein presentation of the credential to the digital identity system renders at least part of the captured data available to a presenting entity.

In embodiments, the captured data may also comprise an attribute of the document, The identity document may be a passport or driving licence.

The user device is may be smart device, such as a smartphone or tablet.

Another aspect is directed to a user device comprising:

a camera;

a processor configured to execute digital identity software which operates to:

capture with the camera of the user device an image of the face of a user of the device;

capture data from a real-world identity document, the data including an identification photograph, wherein the data is captured with the camera, from an electronic transmitter embedded in the anchoring document, or a combination of both;

transmit the image of the user and the captured data to a digital identify system; and receive from the digital identify system a credential for the user, wherein presentation of the credential to the digital identity system renders at least part of the captured data available to a presenting entity.

Another aspect is directed to a computer implemented method implemented by a digital identity system, the method comprising:

receiving in an electronic message from a user device: an image of the face of a user of the user device which has been captured at the user device; and data which has been captured from a real-world identity document and which comprises an identification photograph;

storing at least part of the captured data at the digital identity system in persistent electronic storage;

comparing the image of the face with the identity photograph using a facial verification algorithm; and only if the image of the face matches the identification photograph, generating a credential for the user and transmitting the credential to the user, wherein presentation of the credential to the digital identity system renders at least part of the stored data available to a presenting entity.

In embodiments, an attribute of the document may be received in the message, and the credential may be generated and transmitted only if the attribute meets a predetermined criteria. The photograph and/or image may be made available to the presenting entity.

Another aspect is directed to a digital identity system comprising:

a network interface configured to send and receive electronic messages;

a processor configured to perform operations comprising:

receiving in an electronic message from a user device: an image of the face of a user of the user device which has been captured at the user device; and data which has been captured from a real-world identity document and which comprises an identification photograph;

storing at least part of the captured data at the digital identity system in persistent electronic storage;

comparing the image of the face with the identity photograph using a facial verification algorithm;

only if the image of the face matches the identification photograph, generating a credential for the user; and transmitting the credential to the user, wherein presentation of the credential to the digital identity system renders at least part of the stored data available to a presenting entity.

Another aspect is directed to a method of authenticating a digital credential of a bearer by a validating device, the method comprising:

capturing the bearer credential by the validating device;

transmitting to a validation service the bearer credential with a validator credential bound to the validating device;

at the validation service, validating the bearer credential and the validation credential, and if the validator credential is valid, using the bearer credential to access a data item of a digital profile and creating an electronic message for transmission to the validating device, the electronic message indicating the data item and comprising a fresh validator credential generated by the validation service;

issuing a fresh bearer credential and creating an electronic message to transmit the fresh bearer credential to an address associated with the bearer.

In embodiments, the method may comprise the step of using the validator credential to access a data item of a digital profile associated with the validating device and creating an electronic message for transmission to the bearer, the electronic message indicating a data item for verification by the bearer.

The electronic message may indicate the data item by providing a link to a version of the digital profile held at an addressable memory location identified in the link.

The electronic message which indicates the data item for verification by the bearer may indicate the data item by providing a link to a version of the digital profile associated with the validator at an addressable memory location indicated by the link.

The data item may comprise a visual image of the bearer or validator respectively.

The fresh bearer credential may be generated for transmission to the bearer is comprised in a receipt having a transaction identifier. The validation service may generate a master receipt having the same transaction identifier as the receipt generated for transmission to the bearer, wherein the master receipt may be stored in a master receipt book.

The fresh validator credential may be comprised in a non-matching receipt having the same transition identifier.

The address associated with the bearer may comprise an address of a device previously registered by the bearer and stored in association with the bearer credential.

The step of generating a fresh credential may comprise using a randomly generated sequence to generate a fresh credential bound to the digital profile.

The credentials may be one-time only use.

Another aspect is directed to a method of providing access to digital profiles held in persistent electronic storage of a digital identity system, the method comprising:
  receiving from a requesting entity an electronic request message identifying a target entity;
  in response to the request, publishing: (i) a digital profile of the target entity by storing a version of that profile in an addressable memory location, and (ii) a digital profile of the requesting entity by storing a version of that profile in another addressable memory location;
  generating two non-matching receipts, each comprising a transaction identifier, a first of which comprises a link identifying the memory location to which the target entity's profile is published, the second of which comprises a link identifying the other memory location to which the requesting entity's profile is published;
  transmitting the first receipt to an address associated with the requesting entity; and
  transmitting the second receipt to an address associated with the target entity.

In embodiments, a target credential may be associated with the target entity's profile and a requestor credential may be associated with the requesting entity's profile in a database of the digital identity system, and the step of publishing may be conditional on matching target and requestor credentials being received in the electronic request message.

The credentials may be one-time use only, and the method may comprise generating a fresh target and a fresh requestor credential and associating them with the target entity's profile and the requesting entity's profile in the database respectively, the fresh target and requestor credentials being included in the second and first receipt respectively.

The method may comprise storing a master receipt at the digital identity system, the master receipt comprising data of both receipts and being stored in a master receipt book.

The master receipt may comprise both links and the transaction identifier but may not include the fresh credentials.

The target entity may be a bearer and the requesting entity a validator, the bearer's profile being a pre-existing digital profile which is accessed in the persistent electronic storage in response to the request.

The target entity may be a registrant and the requesting entity may be an enrolment module executing on a processor of the digital identity system which has created the digital profile in the persistent electronic storage.

A respective confidence value may be allocated to each profile which is published with that profile and accessible via the respective link.

Another aspect is directed to a computer system comprising a network interface configured to transmit and receive electronic messages, and a processor configured to implement the method of any preceding claim.

Another aspect is directed to a digital identity system comprising:
  a network interface configured to send and receive electronic messages;
  persistent electronic storage holding a digital profile of a target entity and a digital profile of the requesting entity;
  a publication module executing on a processor configured to receive from the requesting entity an electronic request message identifying the target entity and, in response to the request, publish: (i) the target entity's digital profile by storing a version of that profile in an addressable memory location, and (ii) the requesting entity's digital profile by storing a version of that profile in another addressable memory location;
  a receipt generation module executing on a processor configured to generate two non-matching receipts, each comprising a transaction identifier, a first of which comprises a link identifying the memory location to which the target entity's profile is published, the second of which comprises a link identifying the other memory location to which the requesting entity's profile is published, wherein the first receipt is transmitted to an address associated with the requesting entity and the second receipt is transmitted to an address associated with the target entity.

Another aspect is directed to a digital identity system comprising:
  an enrolment module executing on a processor configured to receive a data item from an enrolling device and to create in persistent electronic storage a digital profile comprising the data item;
  a credential creation module executing on a processor configured to generate a credential from a random sequence, to associate the credential with the digital profile in a database, and to transmit the credential to the enrolling device;
  a publication module executing on a processor configured, in response to later presentation of the credential to the digital identity system, to publish the digital profile by storing a version of the digital profile in a memory location accessible to a device presenting the credential.

In embodiments, the enrolment module executing on a processor may be configured to also receive metadata of the enrolling device, which is stored in the database in association with the profile.

The credential may be generated from the random sequence and the metadata, and the credential may be associated with the profile by storing the random sequence and the metadata in the database in association with the profile, and wherein the system may comprise a validation module executing on a processor configured to generate a copy of the credential from the sequence and metadata stored in the database, and the publication of the profile may be conditional on the presented credential matching the copy.

The metadata may comprise an identifier of the enrolling device, and the publication of the profile may also also conditional on a matching device identifier being presented with the credential, whereby use of the credential is restricted to the enrolling device.

The credential may be associated with the profile by storing a copy of the credential in the database in association with the profile, wherein the system may comprise a validation module executing on a processor configured to validate the presented credential by comparing it with the copy and the publication of the profile may be conditional in the presented credential being valid.

A link identifying the addressable memory location may be transmitted to the presenting device.

The link may be generated from a random sequence. The addressable memory location may be selected based on a random sequence.

Another aspect is directed to a digital identity system according to claim 1 wherein the persistent electronic storage also holds another digital profile associated with another credential and comprising a data item which has been received from the presenting device, wherein both credentials are presented by the presenting device, and in response the other profile is published to a different memory location accessible to the enrolling device.

In embodiments, the digital identity system may comprise a receipt generation module executing on a processor configured to generated two non-matching receipts, one of which is transmitted to the presenting device and comprises a link identifying the memory location to which the profile is published, the other of which is transmitted to the enrolling device and comprises a link identifying the other memory location to which the other profile is published.

The digital identity system according may comprise a confidence value allocation module executing on a processor configured to allocate a confidence value to the profile based on at least one of: a type of the received data item and a source of the data item.

Another aspect is directed to a method implemented at a digital identity system and comprising:
receiving a data item from an enrolling device;
creating in persistent electronic storage a digital profile comprising the data item;
generating a credential from a random sequence;
associating the credential with the digital profile in a database;
transmitting the credential to the enrolling device, wherein later presentation of the credential to the digital identity system causes publication of the digital profile by storing a version of the digital profile in a memory location accessible to a device presenting the credential.

Another aspect is directed to a method of providing access to a digital profile comprising:
receiving a one-time only use credential associated with a digital profile in persistent electronic storage;
validating the credential and, only if the credential is valid, publishing the profile to an addressable memory location by storing a version of it at the memory location, thereby invalidating the credential;
generating a fresh one-time only use credential for the digital profile;
associating the fresh credential with the digital profile; and
transmitting the fresh credential to an address associated with an entity, whereby the entity can use the fresh credential once thereafter to cause the profile to be republished to a different addressable memory location.

Another aspect is directed to a computer system comprising a network interface and a processor configured to implement the method.

Another aspect is directed to a computer system comprising:
electronic storage;
a network interface configured to receive electronic messages;
a processor configured to execute identity management code which operates to:
receive an electronic message from the network interface, the message including at least one data item to be included in a digital profile for an entity, the data item associated with the entity and uniquely identifying the entity;
extract the data item from the electronic message;
create a digital profile using the data item in the electronic storage, wherein the profile comprises the data item;
allocate a confidence value to the profile, wherein the confidence value is allocated based on at least one of a source of the electronic message and a type of the data item; and
create and transmit a credential to the entity, wherein presentation of the credential to the computer system renders a version of the digital profile and the confidence value available to a presenting entity.

In embodiments, the electronic may hold a plurality of digital profiles associated with the entity, each digital profile comprising a unique set of data items for that digital profile. At least some of the data items may be shared between the unique sets.

In embodiments, the electronic storage may hold anchoring documents in association with the digital profiles, wherein an anchoring document may be received in the electronic message and the data item has been extracted from the anchoring document.

The confidence value may be allocated based on the type and/or age of the anchoring document.

The confidence value may be allocated based on the source of the anchoring document.

The version of the profile may be rendered available by storing it to an addressable memory location, and transmitting a link identifying the memory location to the presenting entity.

The processor may be configured to create and transmit a credential each time a data item is stored in a digital profile, wherein presentation of each credential to the computer system may cause a respective version of it to be stored to a different addressable memory location, whereby multiple versions of the profile may be published.

The memory location may be selected based on a random sequence. The link mat be generated from a random sequence.

The link may be a Uniform Resource Indicator.

One of the data items may be a visual image of the entity.

The entity may be a person and the visual image is a facial image of the person.

The electronic storage may comprise a device metadata storage section which holds metadata associated with computer devices which have been used to transmit electronic messages to the network interface.

The electronic storage may hold one or more digital profiles for each of multiple entities.

The digital profile may comprise multiple data items received from the entity.

The identity management code may be operable to allocate a confidence value associated with a source of the electronic message, such that when the source of the electronic message is unknown to the computer system, the confidence value is low.

When the source of the electronic message is known to the computer system, the identity management code may be operable to allocate a confidence value appropriate to the status of the source of the electronic message.

When the source of the electronic message is a document issuing authority, the confidence value which is allocated may be high.

The identity management code may be operable to allocate a confidence value such that when one of the multiple entities which has a digital profile held in the electronic storage is the source of the electronic message, a contingent trust value associated with that entity is used to calculate the confidence value.

The contingent trust value may be dependent on usage of the digital profile by the multiple entities in one or more authentication process.

The identity management code may be operable to update the digital profile on receipt of further data items, and wherein the allocated confidence value is changed when the profile is updated.

The processor may be configured to change the allocated confidence value over time based on a clock signal.

The confidence value may be increased in response to receiving an additional visual image of the entity.

The entity may be required to present a new data item when subsequently logging on to the system, and the confidence value may be changed based on the new data item.

The new data item may be a visual image of the entity.

The identity management code may be operable to receive a data item from a third party to assign a profile to the entity, and wherein the confidence value which is allocated may depend on the status of the third party.

The electronic message may be received from the entity.

The electronic message may be received from another entity different than the entity.

The data item may be one of two data items are received in the message, a first of which is an image of the entity which has been captured with a camera and the second of which is an identification photograph which has been captured from a real-world identity document, and the confidence value may be allocated by comparing the two data items and may reflect an extent to which they match, The two data items may be compared using a facial verification algorithm.

Another aspect is directed to a computer-implemented method of managing a digital profile comprising: receive an electronic message including at least one data item to be included in a digital profile for an entity, the data item associated with the entity an uniquely identifying the entity;
  extracting the data item from the electronic message;
  creating a digital profile using the data item in electronic storage, wherein the profile comprises the data item;
  allocating a confidence value to the profile, wherein the confidence value is allocated based on at least one of a source of the electronic message and a type of the data item; and
  creating and transmitting a credential to the entity, wherein presentation of the credential to the computer system renders a version of the digital profile and the confidence value available to a presenting entity.

Another aspect is directed to a computer program product comprising code stored on a computer readable storage medium and configured to implement any method, system or device functionality disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, or, any processor, controller, microcontroller, or state machine. A processor also may be implemented as a combination of electronic devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. Storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments is not intended to be exhaustive or to be limiting to the precise form disclosed above. While specific embodiments and examples are described above for illustrative purposes, various equivalent modifications are possible within the scope of the inventions described herein, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not only the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A digital identity system comprising:
 a computer interface for receiving electronic messages; and
 one or more hardware processors configured to execute:
  an enrolment module configured to receive a data item captured from an identity document, and create in persistent electronic storage a digital identity comprising the data item;
  a credential creation module configured to transmit from the digital identity system to a user device via the computer interface a credential for storing at the user device, the credential being bound to the digital identity; and a validation service configured to receive an electronic message comprising the credential and identifying a target device, validate the credential, and if the credential is valid, use the credential to transmit from the digital identity system to the target device, an electronic message so as to render the data item of the digital identity available to the target device.

2. A digital identity system according to claim 1, wherein the one or more processors are configured to execute a publication module configured to publish the data item of the digital identity, by storing a version of the data item in a memory location of the digital identity system accessible to the target device, wherein publishing the data item of the digital identify renders the data item of the digital identity available to the target device, and wherein the version of the data item published in the memory location of the digital identity system is unaffected by future modifications of the digital identity to provide a snapshot of the data item of the digital identity at a time of a transaction in which the electronic message is received.

3. A digital identity system according to claim 1, wherein the one or more processors are configured to execute a verification service configured to compare data captured from the identity document with an identifier captured from a user at the user device; and
wherein the creation of the digital identity, the issuing of the credential, or the transmitting of the electronic message to the target device is conditional on the identifier matching the data captured from the identity document.

4. A digital identify system according to claim 3, wherein the identifier is a biometric identifier and the data is biometric data.

5. A digital identity system according to claim 4, wherein the biometric data is an identification photograph and the biometric identifier is a facial image.

6. A digital identity system according to claim 1, wherein the digital identity system is configured to associate the digital identity with an asset.

7. A digital identity system according to claim 6, wherein the asset is a digital wallet or a sum of money.

8. A digital system according to claim 6, wherein the asset is associated with the digital identity such that the user can use the asset by presenting the credential to the target device for transmission in the electronic message to the validation service or by transmitting the credential to the validation service in the electronic message.

9. A digital identity system according to claim 6, wherein the electronic message transmitted to the target device renders the asset or information relating to the asset available to the target device.

10. A digital identity system according to claim 6, wherein the asset is a physical asset, wherein data identifying the physical asset is stored at the digital identity system in association with the digital identity.

11. A digital identity system according to claim 6, wherein the asset is digital asset, wherein the digital asset or data about the digital asset is stored at the digital identity system in association with the digital identity.

12. A digital identity system according to claim 1, wherein the target device is identified by a target entity credential comprised in the message.

13. A digital identity system according to claim 1, wherein the electronic message is received from the user device.

14. A digital identity system according to claim 1, wherein the electronic message is received from the target device, the credential having been captured at the target device.

15. A computer-implemented method of creating a digital identity comprising:
at a user device, capturing a data item from an identity document;
creating on a processor of the user device an electronic message comprising the data item;
transmitting the electronic message from the user device to a digital identity system;
receiving at the user device from the digital identity system an electronic message comprising a credential, which is bound to a digital identity comprising the data item, the digital identity having been created at the digital identity system in response to the electronic message comprising the data item; and
storing the credential in memory of the user device, wherein later presentation of the credential to the digital identity system causes the data item of the digital identity to be rendered available to a target device presenting the credential.

16. A method according to claim 15, comprising capturing at the user device a facial image or other biometric identifier of a user of the user device, which is included in the electronic message transmitted to the digital identity system.

17. A method according to claim 15, comprising transmitting, from the user device to the digital identity system, a digital asset or information about an asset for associating with the digital identity.

18. A user device comprising:
a memory; and
a hardware processor coupled to the memory and configured to execute computer readable instructions which, when executed on the hardware processor, cause the hardware processor to:
capture a data item from an identity document,
create an electronic message comprising the data item,
transmit the electronic message from the user device to a digital identity system,
receive from the digital identity system an electronic message comprising a credential, which is bound to a digital identity comprising the data item, the digital identity having been created at the digital identity system in response to the electronic message comprising the data item; and
store the credential in the memory, wherein later presentation of the credential to the digital identity system causes the data item of the digital identity to be rendered available to a target device presenting the credential.

19. A non-transitory computer readable storage medium comprising code executable a user device to implement steps of:
capturing a data item from an identity document;
creating an electronic message comprising the data item;
transmitting the electronic message from the user device to a digital identity system;
receiving from the digital identity system an electronic message comprising a credential, which is bound to a digital identity comprising the data item, the digital identity having been created at the digital identity system in response to the electronic message comprising the data item; and
storing the credential at the user device, wherein later presentation of the credential to the digital identity system causes the data item of the digital identity to be rendered available to a target device presenting the credential.

20. A digital identity system comprising:
a computer interface for receiving electronic messages; and
one or more hardware processors configured to execute:
- an enrolment module configured to create in persistent electronic storage a digital identity comprising a data item;
- a credential creation module configured to associate a credential with the digital profile, and transmit the credential from the digital identity system to a credential-receiving device;
- a computer interface configured to receive, in a transaction, an electronic message comprising the credential and identifying a target device, the message being received from the credential-receiving device or the target device having captured the credential from the credential-receiving device; and
- a publication module configured to, in response to the electronic message, publish the data item of the digital identity, by storing a version of the data item in a memory location of the digital identity system accessible to the target device, wherein the version of the data item published in the memory location of the digital identity system is unaffected by future modifications of the digital identity to provide a snapshot of the data item of the digital identity at a time of the transaction.

* * * * *